US012702534B1

(12) United States Patent
Melikyan et al.

(10) Patent No.: US 12,702,534 B1
(45) Date of Patent: Aug. 11, 2026

(54) MULTIFUNCTIONAL ADJUSTABLE VIBRATING END-TUFTED DEVICE FOR A SYSTEMATIC INDIVIDUAL AND PROFESSIONAL ORAL HYGIENE ACCORDING TO THE CONCEPT OF TEMPERATURE EQUILIBRIUM

(71) Applicants: Melikset Litvinovich Melikyan, New York, NY (US); Karine Meliksetovna Melikyan, New York, NY (US)

(72) Inventors: Melikset Litvinovich Melikyan, New York, NY (US); Karine Meliksetovna Melikyan, New York, NY (US); Garegin Meliksetovich Melikyan, Moscow (RU)

( * ) Notice: Subject to any disclaimer, the term of this patent is extended or adjusted under 35 U.S.C. 154(b) by 412 days.

(21) Appl. No.: 18/088,921

(22) Filed: Dec. 27, 2022

(51) Int. Cl.
*A61C 17/34* (2006.01)
*A46B 5/00* (2006.01)
*A61H 35/04* (2006.01)

(52) U.S. Cl.
CPC ........ *A61C 17/3481* (2013.01); *A46B 5/0095* (2013.01); *A61H 35/04* (2013.01)

(58) Field of Classification Search
CPC ...... A61C 17/3481; A46B 9/021; A45D 29/14
See application file for complete search history.

(56) References Cited

U.S. PATENT DOCUMENTS

D116,066 S * 8/1939 Twomey ........................ 132/320
6,033,143 A * 3/2000 Gueret .................... A45D 40/28 401/129
2005/0031401 A1* 2/2005 Gueret ................. A46B 5/0062 401/129
2006/0123576 A1* 6/2006 Howard ................. A46B 9/021 15/195
2006/0174436 A1* 8/2006 Brezler .................... A46D 1/00 15/207.2

FOREIGN PATENT DOCUMENTS

WO WO-2010086513 A1 * 8/2010 ............. A61H 7/005

* cited by examiner

*Primary Examiner* — Shay Karls

(57) ABSTRACT

Proposed are a multifunctional adjustable vibrating device for individual and professional oral care, cleaning or polishing of surfaces of teeth, composite restorations, and removable and nonremovable dental structures, and a method for cleaning of a surface of teeth, composite restorations, and removable and nonremovable dental structures using said device according to the concept of temperature equilibrium by M. L. Melikyan, aimed at improving the effectiveness of oral care. The proposed device comprises a handle having a driving mechanism and a replaceable nozzle attached to the handle and having a fixing part and a working part, the replaceable nozzle is configured to adjust the degree of impact of bristles on the surface of teeth, composite restorations, or dental structures, depending on the pressing force on the replaceable nozzle.

3 Claims, 7 Drawing Sheets

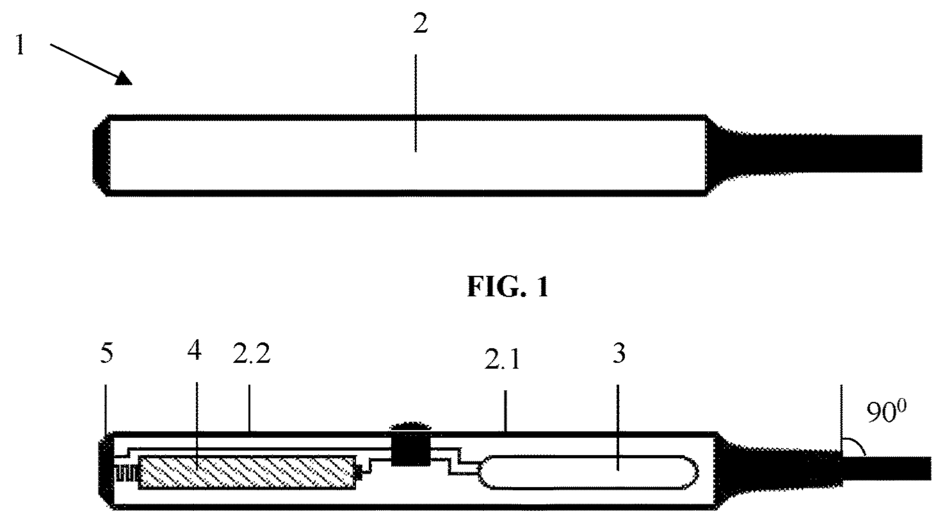
FIG. 1
FIG. 2
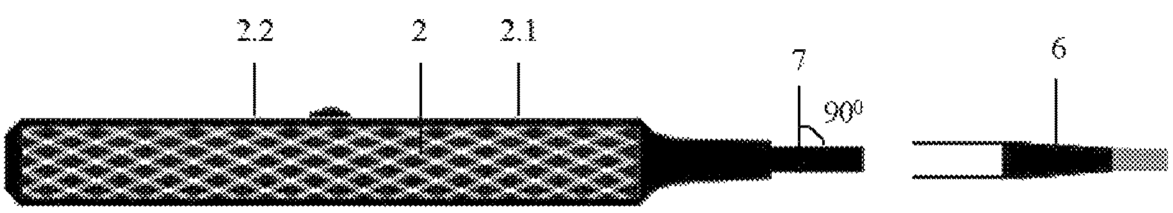
FIG. 3A
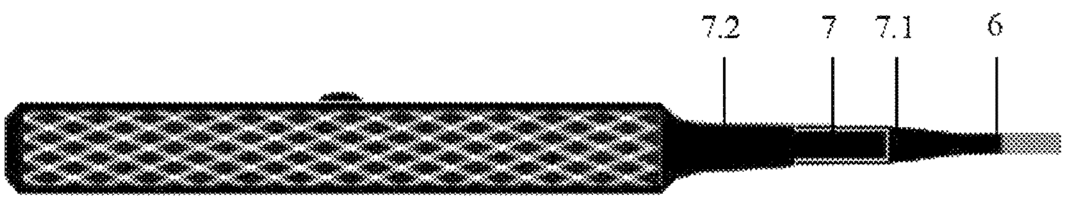
FIG. 3B

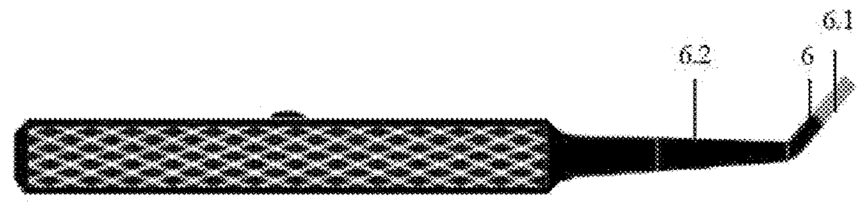
FIG. 3C
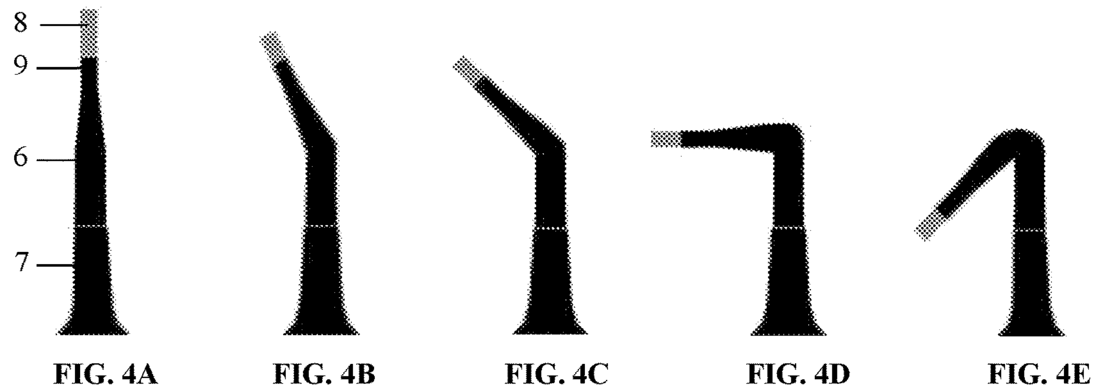
FIG. 4A FIG. 4B FIG. 4C FIG. 4D FIG. 4E
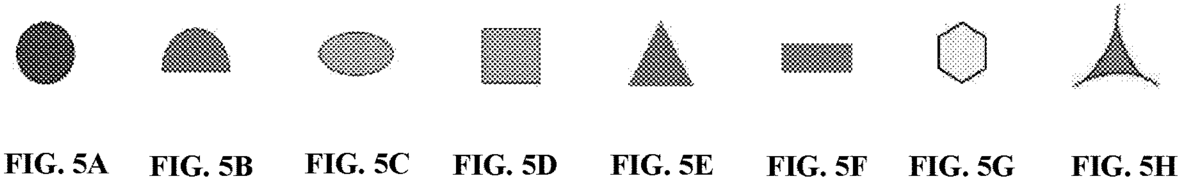
FIG. 5A FIG. 5B FIG. 5C FIG. 5D FIG. 5E FIG. 5F FIG. 5G FIG. 5H
FIG. 6A
FIG. 6B

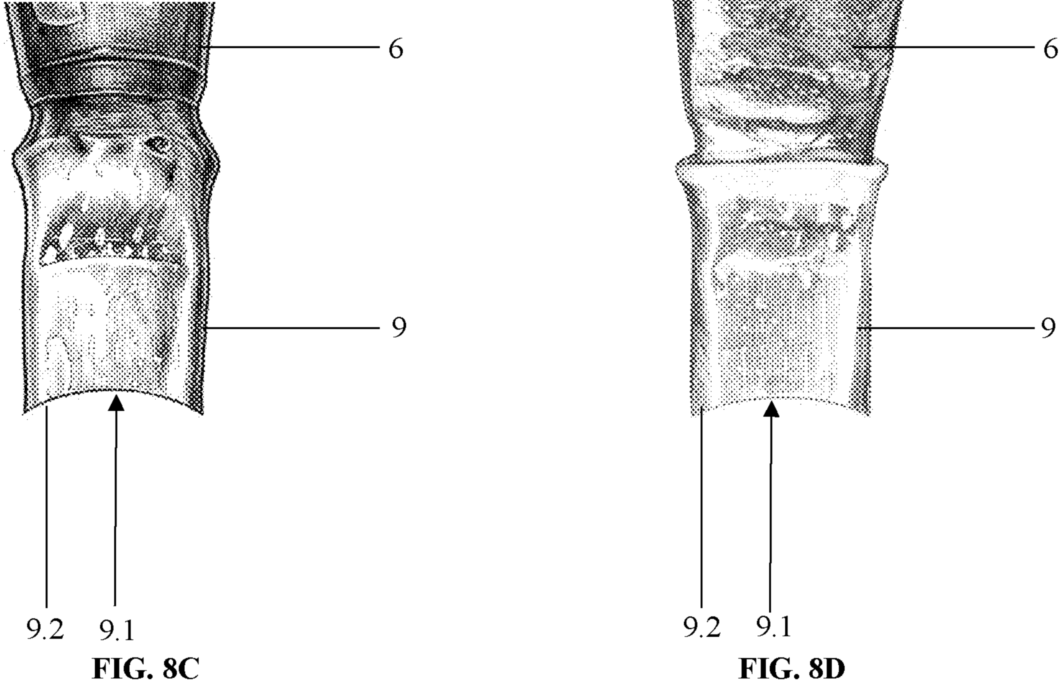
FIG. 8C
FIG. 8D
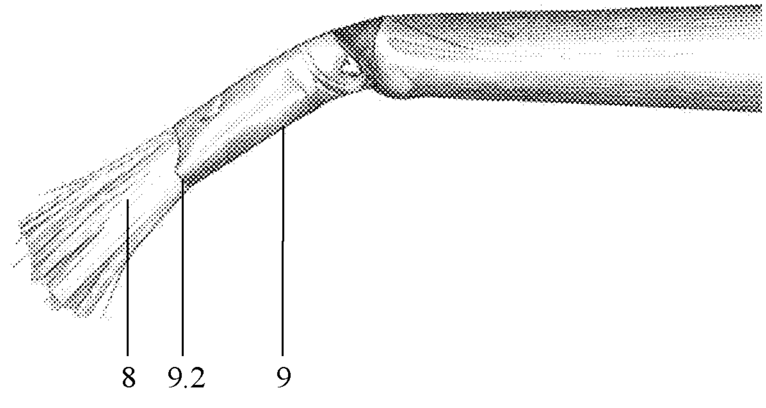
FIG. 9A

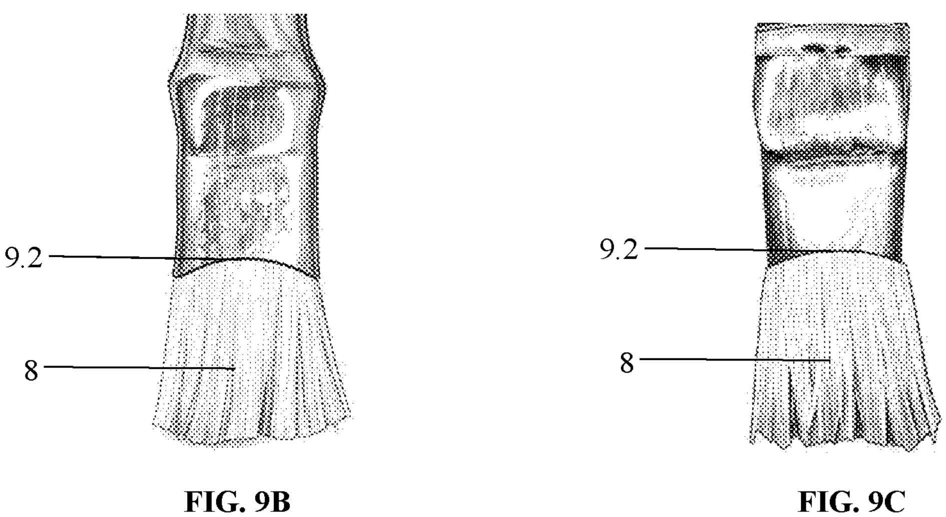
FIG. 9B
FIG. 9C
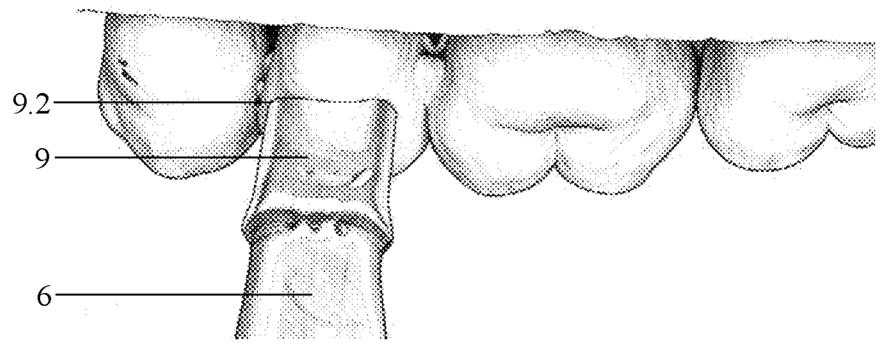
FIG. 10
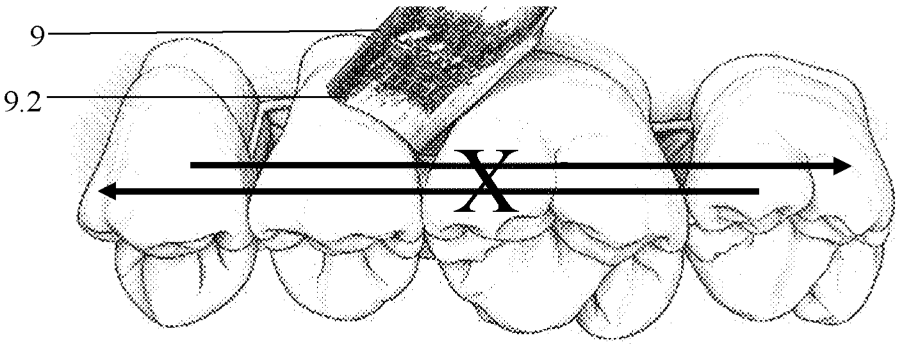
FIG. 11

MULTIFUNCTIONAL ADJUSTABLE VIBRATING END-TUFTED DEVICE FOR A SYSTEMATIC INDIVIDUAL AND PROFESSIONAL ORAL HYGIENE ACCORDING TO THE CONCEPT OF TEMPERATURE EQUILIBRIUM

FIELD OF THE INVENTION

The present invention relates to medicine, in particular to dentistry, more particularly to oral hygiene, and can be used for an atraumatic single-step cleaning and polishing method of natural teeth, composite restorations, and dental structures according to the concept of temperature equilibrium according to M. L. Melikyan, using a multifunctional adjustable vibrating device for individual and professional oral hygiene.

BACKGROUND

Presently, various methods and devices have been developed for maintaining oral hygiene. Oral hygiene is understood mainly as a mechanical procedure to remove food debris and soft plaque from the surfaces of fixed and removable dental structures to maintain oral health. A distinction is made between individual oral hygiene, which is carried out at home, and professional oral hygiene, which is carried out in the office of a dentist. Professional oral hygiene includes professional dental cleaning, which helps keep teeth and gums healthy and reduces the risk of certain oral diseases. Tooth cleaning, whether it is a professional tooth cleaning or at-home cleaning, removes unwanted food and bacterial deposits in the mouth.

Cleaning includes, without limitation, the removal of plaque with a toothbrush. Daily plaque removal with a toothbrush plays an important role in preventing two major causes of tooth loss: tooth decay and gum disease.

Today, there are numerous ways to make one's teeth healthy and beautiful. As a rule, toothbrushes are used for this purpose. A toothbrush is an oral hygiene tool used for cleaning teeth, gums and tongue, particularly for mechanically removing plaque from the teeth, gums and tongue, and also for massaging the gums. It comprises a head with closely spaced bristles, over which toothpaste can be applied, with the head mounted on a handle that facilitates cleaning hard-to-reach places in the mouth. The length of the working surface of manual toothbrush is on average 25-30 mm, width 7.5-11 mm, height of the bristles 10-12 mm.

A huge range of toothbrush models is available, differing in design, cleaning technology, materials, and other parameters. Toothbrushes are also available for children, teenagers, and adults.

The regular manual toothbrush, otherwise known as a manual toothbrush, is the best-known and most popular one. This simple device is known since the end of the XVIII century and became today the extremely reluctant to surrender its position in favor of electric toothbrushes. Throughout its existence, this item of hygiene has undergone numerous transformations, however, maintaining the main function, to ensure cleanliness in the oral cavity.

Besides conventional brushes, which are static and operated only manually, there are also the automatic toothbrushes, which include electric, sound, and ultrasonic brushes. The choice of brush is based on personal preferences and financial capabilities. Brushes are getting better and more functional every year.

To ensure the quality of oral hygiene with a classic hand brush, it is necessary to make long and careful sweeping and circular movements from the gum to the edge of the tooth, paying special attention to hard-to-reach places. The advantages of classic toothbrushes are their compactness (they take up little space) and affordability, no need to purchase additional nozzles and batteries, easy replacement because of low cost, and no trauma to gums and enamel with the right choice of their hardness.

However, classic toothbrushes also have several disadvantages. In particular, manual brushes do not provide quality cleaning of plaque from hard-to-reach areas of the teeth, with horizontal cleaning motions of the brush, plaque is smeared and driven into the dental sulcus, and inexpensive toothbrushes can injure the gums and cause inflammation. Also, even with proper toothbrush movements, a small amount of toothpaste remains on the teeth surface, which reduces the effectiveness of cleaning, classic toothbrushes "consume" a lot of toothpaste when cleaning, and so classic toothbrushes "consume" a lot of toothpaste when cleaning of teeth. In addition, excessive pressure on the hand brush can cause artificial enamel abrasion, hypersensitivity, wedge-shaped defects, and gum recession (attrition). It should be noted that manual brushes take longer to brush plaque than electric or ultrasonic brushes, and for people with arthritis, disabilities, or mobility issues, the cleaning motion can be uncomfortable. Finally, a regular plastic brush does not decompose for 4 thousand years, which pollutes the environment and causes harm (given the number of people and frequency of brush changes).

The electric toothbrush was invented for people with disabilities. The electric brush has an oscillating, rotating, or vibrating head that provides a large number of cleaning actions with minimal user movement. It runs on batteries or is charged with a rechargeable battery. It should be noted that one should not put too much pressure on gums and teeth when using an electric toothbrush.

Electric toothbrushes do a better job than regular manual toothbrushes at removing tartar, plaque and cleaning hard-to-reach places. The rotating and oscillating motion of the head of an electric toothbrush helps remove plaque from the teeth surface more effectively than a regular toothbrush. Electric toothbrushes are especially useful for people with limited hand or arm movement, people with disabilities, or the elderly who cannot use a regular toothbrush to thoroughly brush their teeth.

To brush teeth well with an electric toothbrush, one does not have to spend a lot of time, one just has to run it over teeth, dabbing them. Electric toothbrushes remove 21% more plaque than manual toothbrushes. They provide time and effort savings. The electric toothbrush perfectly removes plaque and food debris by rubbing the bristles against tooth enamel and gums, protecting against tartar formation. The electric toothbrush is suitable for teeth with healthy enamel, without hyperesthesia.

The disadvantages of electric toothbrushes include their high price compared to classic toothbrushes, the high price of the nozzles, and the need to charge most models of electric toothbrushes. Regarding the nozzles for these brushes, it should be noted that they require regular replacement, at least once every 3 months, which can also be quite expensive. These brushes can be used only twice a week because of the rapid erosion of enamel. They can cause bleeding gums, increase the risk of recession (gum loss), or abrasion of enamel and composite restorations, so they are not suitable for people with sensitive teeth and gums, as it can often be difficult to find soft-bristle nozzles for these brushes. Also, not all people like the feeling of vibration in the mouth when using electric toothbrushes, and sometimes the vibration can cause people a headache, up to nausea.

Importantly, electric brushes are contraindicated for people with serious cardiovascular disease, pregnant women, cancer patients after oral surgery, and for stomatitis and gingivitis.

Ultrasonic toothbrushes are characterized by having over one million revolutions per minute, which provides the benefits of an ultrasonic toothbrush, comprising the fact that generated by the sound vibrating wave acts on saliva and toothpaste, softening and gently removing plaque without using crude mechanics. High frequency vibration breaks the chains of bacteria, leaving them no chance to attach to the surfaces of the teeth, and high vibration is extremely effective in clearing surfaces of plaque, old tartar, especially noticeable in smokers and coffee drinkers. Also, regarding the benefits of an ultrasonic toothbrush, it can be noted that their use strengthens the gums and reduces bleeding gums, provides significant savings in toothpaste, and ultrasonic toothbrushes are effective without toothpaste, there is no mechanical contact with the teeth, while the most hard-to-reach places are cleaned and there is no need to apply an effort.

However, ultrasonic toothbrushes also have disadvantages. In particular, ultrasound can severely traumatize tooth enamel and the teeth themselves, and ultrasound creates high-frequency vibrations that can easily traumatize the tooth surface and lead to traumatic nerve inflammation (pulpitis). Further, improper use of ultrasonic toothbrushes can cause mechanical damage as cracked enamel and chipped teeth, and even with proper use, teeth can crack and chip sometime after cleaning (days or weeks later). In addition, ultrasonic toothbrushes can cause damage to dental restorations (crowns, veneers, fillings) and can cause scratches and roughness on tooth surfaces. Finally, they can only be used 3 times a week and are expensive.

The ultrasonic toothbrushes may not be used by everyone, especially young children). Ultrasonic toothbrushes are not recommended if one have fillings, crowns, veneers, braces or implants, any other structures in the mouth; with high dental mobility and recent dental surgery; in gum disease (periodontal disease, periodontitis), stomatitis, gingivitis, pulpitis, abnormal enamel fragility, cancer and pre-cancerous disease in the mouth, severe gum and tooth sensitivity, severe gum bleeding, pregnancy, blood diseases, epilepsy, or heart problems (especially a pacemaker use).

The main requirements for a toothbrush are that the bristles be soft to avoid trauma to the gums and abrasion of tooth enamel, and synthetic, to avoid instant exposure to pathogenic bacteria. Each type of toothbrush has its own characteristics, purpose, advantages and disadvantages.

Choosing the right toothbrush and toothpaste is important for good oral hygiene. When choosing a toothbrush, pay attention to the shape and length of the head, the material and density of the bristles as a fiber treatment, the hardness of the bristles, the weight of the brush and the convenience of the handle.

Depending on the type of bristles, brushes are artificial or natural (made from animal hair). According to the material of the bristles, brushes are nylon, Setron, Perlon, Derolon, polyurethane, or combined.

According to the arrangement of the bundles, brushes can be divided into one-, two-, three-, or multi-level. According to the processing of the bristles, brushes are sliced, rounded, polished, brushed, combined.

Depending on the hardness of the bristles, the following brushes are used: soft (for children under 12 years old, and with teeth hypersensitivity and acute diseases of the gums and mucosa); medium hard (for all patients over 12 years old with healthy teeth); and hard (with an increased tendency to tartar). Since a toothbrush, as mentioned above, is a tool for mechanical removal of plaque and massage of the gums, it should be chosen according to the individual characteristics of the body. For sensitive gums, the bristles of the brush should be softer, and for the removal of stale plaque it should be tougher. Inexpensive toothbrushes can traumatize gums because the tips of the bristles are sharp and can prick gums. Pathogenic microorganisms get into these microcracks, which leads to an inflammatory process.

Traditionally, cleaning is done with the tips of the bristles of a manual or automatic toothbrush. The short bristles of the toothbrush brush the chewing surface of teeth, while the soft and long bristles are great for cleaning the enamel and are gentle on the gums. American and Canadian dentists insist on using only soft brushes and recommend replacing them every three or four months, or more often if the bristles wear out.

According to World Health Association statistics, 92% of people do not brush their teeth correctly. According to the rules of traditional cleaning, a daily oral cleaning should take at least 3 minutes. Cleaning of teeth starts with the upper jaw and then moves on to the lower jaw, with the head of the brush at an angle of 45 degrees to the tooth row and should follow the correct direction of movement according to which the movement is performed from gum to tooth. During cleaning, all accessible tooth surfaces are treated, namely the outer (buccal), inner (lingual), and chewing surfaces. After cleaning the upper jaw and lower jaw, the tongue and buccal mucosa are cleaned.

After plaque removal, the tooth surface remains rough. Like sticky tape, it will attract food particles along with the saliva. This will lead to even more rapid formation of dental plaque and crystallization of stony deposits. To minimize these negative effects, one should have teeth polished (also called tooth polishing). Thus, individual and professional teeth polishing (also called teeth polishing) is performed after professional teeth cleaning.

Teeth polishing is a preventive procedure that is used after professional tooth cleaning to remove bacterial plaque biofilm and external stains from the surface of teeth, resulting in a smooth and glossy enamel.

The word "polishing" is understood by oral hygiene professionals as a dual process that comprises "cleaning" and "polishing". The American Dental Hygienists Association distinguishes these closely related terms "cleaning" and "polishing" and defines "cleaning" as "the ability to remove debris and foreign matter from the teeth" and "polishing" as "performing a dental surface treatment." The American Academy of Periodontology defines tooth polishing (as applied to oral health care) as "plaque removal".

It is possible to use a customized way to polish teeth at home. Conventional home tooth polishing, performed with an electric toothbrush and whitening paste, is not effective enough in hard-to-reach areas. In such cases, more effective professional polishing is required.

The goal of professional polishing is to minimize the accumulation of pathogenic bacteria on smooth and glossy tooth surfaces and to maintain periodontal health.

There are currently four ways to polish teeth.

Therapeutic polishing, which refers to "polishing root surfaces that are exposed during surgery to reduce endotoxins and microflora on the cement".

Coronal or cosmetic polishing, which is defined as "a procedure designed to brush the plaque and external stains from the tooth".

Surface polishing, which refers to polishing the crown of a tooth. It is now considered a cosmetic procedure with minimal therapeutic effect.

Selective polishing, which is the selective removal of staining after professional tartar removal, using a rubber cap, bristle brush, and/or air powder polishing system.

Professional tooth polishing solves two tasks: aesthetic, which is the formation of smooth and glossy tooth surface, and hygienic, which is to protect against the accumulation of bacterial plaque on the tooth surface.

Currently, two professional preventive tooth polishing methods have been developed: a mechanical multi-step professional tooth polishing method and an airborne single-step professional tooth polishing method.

In the mechanical multi-step professional method of polishing teeth, the dentist uses special instruments with rotating heads that are fixed to the contra-angle handpiece of the drill.

Traditionally, the polishing tools (nozzles) used for polishing teeth are: rubber polishing cups, tapered polishing brushes, felt polishing discs, polishing strips (strippers), and pastes.

For polishing, the doctor uses several types of abrasive pastes, beginning with coarse and ending with medium, fine, and ultrafine grains. Abrasive pastes are used to form a smooth mirrored enamel surface with a high gloss.

Polishing pastes are available in coarse particles, medium particles, and fine particles. Nozzles and pastes are selected individually, depending on the condition of the tooth enamel.

The doctor chooses a paste of a certain grit, fills in a rubber cup, and then polish the teeth surface. Traditional polishing with rubber caps requires the practitioner to decide on the abrasiveness of the polishing paste, the amount of pressure to be applied during polishing.

Teeth polishing is carried out at a speed of 2500 to 3000 rpm, which allows one to grind the enamel without damaging it. It takes 2 to 5 seconds to polish most tooth surfaces, with the rubber cup contacting the tooth for 4 to 5 seconds. The proper technique with the proper force, pressure, time, and speed should be used during the tooth polishing process to minimize abrasion of the tooth surfaces.

The effectiveness of tooth polishing depends on the number of revolutions per minute (rpm) of the rubber cup polisher, the type of abrasive paste, and the pressure or load between the rubber cup and the tooth.

After polishing, the patient should avoid all colored foods for the first 2-3 days, including tea, coffee, wine, berries and beets. It is also advisable not to smoke, and to foods that are too hot or cold food, to avoid discomfort.

An important factor is the positive feedback from patients about the feeling of smoothness and cleanliness that polishing gives. Traditionally, mechanical polishing of teeth is recommended twice a year.

Professional mechanical tooth polishing removes plaque and stained tooth surface area and slows down the formation of bacterial plaque and tartar.

The disadvantages of the mechanical method of polishing teeth with a rubber cap and prophylactic paste include the fact that it removes the fluoride-rich outer layer of enamel, and over time, causes significant loss of cement and dentin, and that it can cause excessive abrasion of tooth enamel when using pastes with large or medium particles, which contributes to an increased rate of re-formation of exogenous stains and formation of bacterial plaque. In addition, the mechanical method of polishing teeth is labor-intensive, time-consuming, not effective for the complete removal of supragingival deposits, especially in hard-to-reach areas and around orthodontic structures, requires constant control of speed and pressure between the rubber cup and the tooth during polishing, and can form a rough surface, invisible to the naked eye, which contributes to the subsequent formation of staining. Also, the mechanical method of polishing teeth is less effective and takes longer to remove external stains and plaque compared to air polishing.

Contraindications to mechanical tooth polishing include acute gum disease, acute periodontitis, deep cavities, enamel hypersensitivity, gum recession, sensitive teeth, newly erupted teeth, any inflammatory processes in the mouth, allergies to paste ingredients, internal pigmentation, enamel hypoplasia, fluorosis, tetracycline teeth, severe erosion.

Air single-step polishing is a quick, minimally invasive technique that uses a mixture of compressed air, water and fine powder (glycine or sodium bicarbonate) to effectively remove external (surface) staining and biofilm from various tooth surfaces.

In air polishing, polishing powder, water and air are applied in a continuous, precise, and controlled spray. The abrasive action of the powder ensures a high polishing quality. Air polishing of teeth is carried out carefully to avoid trauma to the soft tissues of the mouth.

The air single-step tooth polishing is a highly effective, simple and fast way and provides removing plaque and staining from the teeth surface more effectively than preventive polishing rubber cups, especially in places inaccessible to the cup, removes almost 100% of plaque and helps prevent caries and gum disease, removes plaque and staining three times faster than other traditional polishing methods, provides access to hard-to-reach areas of the teeth and is much less abrasive than traditional polishing pastes, allowing one to thoroughly polish teeth without causing unnecessary "artificial wear" of the tooth surface. Furthermore, this method of tooth polishing provides effective removal of sub-gingival plaque biofilm and stains from the tooth surface, is a safer and more effective method compared to traditional tooth polishing methods, and can replace hand tools and sonic and ultrasonic scalers for removing sub-gingival plaque biofilm in small pockets. The mentioned air single-step method of polishing teeth also allows one to spend less time on polishing compared to the traditional polishing technique, which significantly reduces the time of the patient in the chair and reduces the fatigue of the doctor. It is excellent for sensitive teeth because during polishing there is no heat or pressure, and it is the most effective method for removing stains and plaque from orthodontic structures, braces, and implants.

The disadvantages of air polishing of teeth include the fact that this polishing can cause some gum bleeding, which is not safe when used on exposed root surfaces or restorative materials. In addition, composites and ceramic veneers experience a small but noticeable loss of material with this method.

There is convincing evidence that air polishing can be used regularly to polish teeth, but despite this, the method is not widespread among clinicians.

It should be noted that air polishing is contraindicated in patients with infectious diseases, upper respiratory tract diseases, a weakened immune system, allergies to the ingredients of the polishing powder, and contact lenses.

Furthermore, it should be noted that, in modern dentistry, metal-ceramic crowns and ceramic veneers are widely used because they provide high aesthetics, stable color, and a glossy surface. Despite these advantages, metal-ceramic and ceramic restorations are manufactured using traumatic or aggressive dentition, which contributes to a reduced lifespan of the restored teeth compared to composite restorations that use atraumatic dentition. Currently, composite materials are widely used in the treatment of various dental hard tissue defects. According to the instructions for the use of composite materials, the last step of composite restoration is grinding and polishing, the purpose of which is to create the smoothest, uniform wear-resistant surface with a glossy shine. The formation of a smooth surface is necessary to simulate the high gloss of a composite restoration. But as clinical practice has shown, over time, composite restorations lose their smooth and glossy surface, which leads to aesthetic compromise. Therefore, one of the current problems is the creation and preservation of aesthetics, particularly a stable glossy shine of composite restorations in the smile zone.

One of the underlying reasons that lead to the compromised aesthetics of composite restorations is the degradation of the composite material during functioning.

Composite restorations have been found to be severely affected in the long-term by oral environmental conditions such as moisture, contact with substances with low pH, contact with alcohol or other solvents, and even temperature changes. These factors contribute to the degradation of the composite restoration and the formation of a porous surface layer. Over time, these pores retain dyes, food debris, which deteriorates the aesthetics of the restored tooth.

Thus, the disadvantages of composite materials, which are initially inherent in their physical, mechanical, and physical-chemical properties with time, lead to its degradation and violation of aesthetics. In other words, the degradation and deterioration of the aesthetics of composite restorations is a natural phenomenon.

Another underlying cause that leads to compromised aesthetics of composite restorations is individual cleaning with the well-known traditional, classical, and electric toothbrushes.

Traditionally, the daily systematic individual cleaning of teeth and composite restorations is done with toothpaste and the tips of artificial toothbrushes, which over time results in an artificial microabrasion of the composite restoration surface that is invisible to the eye. Microabrasion results in a micro-roughness on the external surface of composite restoration and turns the glossy surface into a matte one.

The speed and depth of occurrence of micro-roughness depend on the thickness and rigidity of the bristles, the pressure on the working part of the brush, the speed of rotation of the head of electric brushes, and the violation of cleaning instructions (in particular with horizontal cleaning with classic toothbrushes).

Over time, the matte micro-roughened surface of composite restoration retains dyes, which leads to deterioration of its aesthetics. The individual cleaning of composite restorations at home inevitably and naturally leads to artificial microabrasion and micro-roughening of the composite restoration surface and compromised aesthetics.

To reduce microabrasion and micro-roughness, toothbrush manufacturers round, grind, and polish the tips of the bristles. Traditional toothbrushes cannot provide individual, atraumatic cleaning and polishing for composite restorations.

The patient has to increase the pressure on the working part of the brush, the cleaning time or use a stiffer bristled toothbrush to restore the aesthetics of the composite restoration during the individual cleaning process. These measures, individually or in combination, inevitably lead to an increase in the micro-roughness and volume of detained stains and a more rapid and pronounced deterioration in aesthetics, but can also lead to the rapid formation of dental plaque, crystallization of stony deposits on teeth, and trauma to the soft tissues of the mouth.

From the above, one of the main reasons leading to a compromised aesthetics with composite restorations is individual cleaning (i.e., at home). Using traditional toothbrushes is a forced measure, and disturbances in aesthetics are a natural phenomenon.

Thus, the underlying causes of aesthetic disturbances in the composite material are the degradation of the composite material and individual cleaning. In other words, the impairment of the aesthetics of composite restorations is causally related and is a natural phenomenon, which drastically reduces its use in the smile zone.

Over time, when the aesthetics of a composite restoration cannot be restored by individual cleaning, the patient is forced to contact the attending doctor for professional polishing and restoration of the aesthetics of the composite restoration.

At present, a professional preventive mechanical and air-polishing method of composite restoration is used.

For professional (mechanical and air) polishing of composite restorations, a similar technique and similar tools and materials are applied, which are used for professional (mechanical multi-step and air single-step) teeth cleaning.

The advantages of the mechanical multi-step polishing method for composite restorations are that it removes plaque and staining from the composite restoration, slows the formation of bacterial plaque and staining, provides a smooth glossy surface and aesthetics, and helps to extend the life of the composite restoration.

The disadvantages of the mechanical multi-step polishing method for composite restorations include the fact that it causes excessive artificial abrasion of the composite restoration when using pastes with large or medium particles, contributes to an increased rate of re-formation of exogenous staining and the formation of bacterial plaque on the surface of composite restoration, is labor-intensive, time-consuming, and ineffective for complete removal of gingival deposits, especially in hard-to-reach areas, and also requires continuous control of the speed and pressure between the rubber cup and the composite restoration during polishing. In addition, the mechanical multi-step polishing method for composite restorations is less efficient and takes longer to remove biofilm and exogenous staining compared to air polishing and can form a rough surface invisible to the naked eye, which contributes to subsequent staining. In this method, using preventive polishing pastes, sonic and ultrasonic tools significantly increases the surface roughness of composite restorations, and the working field of the polishing cup cannot ensure uniform polishing of the composite restoration surfaces. Also, the disadvantages of this method include the fact that improper and incomplete and polishing increases the risk of biofilm retention, periodontal disease, and that the different polishing tools used increase the material costs and time of the doctor, and increase the cost of polishing.

Contraindications to professional mechanical polishing of composite restorations include acute gum disease, acute periodontitis, gum recession, any inflammatory processes in the mouth, and allergies to the ingredients of the paste.

The advantages of the air single-step polishing method for composite restorations include that it provides more effective removal of bacterial plaque and staining from the surface of the composite restoration than polishing rubber cups, especially in areas inaccessible to the cup; is much less abrasive than traditional polishing pastes and allows thorough polishing of the composite restoration without causing unnecessary "artificial wear" of the composite restoration's surface; is more free of abrasion than conventional polishing pastes; is more gentle on the surface; can replace hand instruments and sonic and ultrasonic scalers to remove subgingival bacterial plaque in small pockets; removes biofilm and staining three times faster than other traditional polishing methods; and provides access to hard-to-reach areas of composite restorations. In addition, this method is highly effective, easy and fast, and the most effective way to remove biofilm staining from orthodontic appliances, braces, and implants. Finally, the single-step air polishing method allows one to spend less time polishing tools and materials on polishing compared to the traditional multi-step polishing method, which significantly reduces the time of the doctor and the patient in the chair and reduces the cost of polishing.

The disadvantages of the traditional air polishing of the composite restorations include the fact that the polishing agent sodium bicarbonate can form a roughness invisible to the naked eye, which contributes to staining on the surface of composite restoration. In addition, care should be taken not to damage adjacent teeth or soft tissues with this method, and this method can cause excessive abrasion of the composite restoration surface when using pastes with large or medium particles, which contributes to an increased rate of exogenous staining reoccurrence and the formation of bacterial plaque.

Air polishing is contraindicated in patients with infectious diseases, upper respiratory tract diseases, weakened immune systems, allergies to ingredients of polishing powder and contact lenses.

It was found that air polishing is not widely used among clinicians compared to mechanical polishing. The dentist performs a professional mechanical or air polishing of the surface layer of the composite restoration and restores the smooth, glossy surface and aesthetics of the composite restoration. During the professional polishing process, the surface of the composite restoration is subjected to artificial microabrasion.

After the professional polishing method of composite restorations, the patient continues with daily individual cleaning with traditional, classic and electric toothbrushes.

Over time, there comes a time when professional polishing cannot ensure the aesthetics of a composite restoration because of significant artificial wear of the surface layer.

To restore the aesthetics and eliminate the wearability of composite restorations, the doctor restores the surface layer with composite material after atraumatic preparation and restores the smooth, glossy surface and aesthetics of the composite restoration after professional grinding and polishing. Subsequently, because of individual and professional cleaning and polishing methods, the aesthetics of the composite restoration are compromised again.

Thus, the principal causes that lead to the compromised aesthetics of composite restorations are degradation of the composite material and individual and professional cleaning and polishing of the composite restoration.

Given the aforementioned disadvantages, the use of composite materials in the smile area is extremely limited. It also follows from the above that preserving the aesthetics, consistent gloss, and wear resistance of composite restorations is a priority in dentistry.

Solving this problem will expand the range of composite materials in the smile zone and provide the general population with affordable, highly effective predictable dental care without traumatic or aggressive methods of preparation of dental hard tissues, which will dramatically minimize the number of complications and increase the functioning time of composite restorations.

Clinical observations made by the authors of the invention have shown that if atraumatic professional mechanical polishing is performed twice a month, it will preserve the aesthetics, ideal smooth surface, and consistent glossy shine of the composite restoration.

Also, the authors of the invention found that this approach preserves the high wear resistance of composite restorations, with restored teeth looking like natural teeth.

The major drawback with this approach is that not all patients wish to have their composite restorations professionally brushed and polished twice a month.

In addition, it is known that the temperature of the teeth corresponds to the temperature of the body. For individual and professional tooth cleaning and polishing, use a toothbrush, toothpaste, polishing paste, and water that is at room temperature. If the temperatures of the bodies are different, heat exchange will occur when thermal contact is established between them. Thus, traditional individual and professional tooth cleaning and polishing are performed under conditions of heat, which can adversely affect dental health.

Thus, to eliminate the above disadvantages of tooth cleaning and polishing, there is a need to create an oral care device that provides high-quality tooth cleaning, polishing and gum massage while minimizing artificial wear of tooth enamel or composite restorations and also eliminating plaque smearing on the tooth surface and trauma to the gums. In addition, there is a need to develop a systematic approach to oral hygiene according to the concept of temperature equilibrium.

The importance of nasal breathing to health, particularly oral health, and the disadvantages of oral breathing and its negative effects, particularly on composite restorations, are also discussed next.

Breathing is an important human function. The healthiest and most efficient way to breathe is through the nose. The function of the nose is to suck in air, which is then heated, humidified and filtered.

The advantages of breathing through the nose are as follows. The nose acts as an air filter, delivering clean air to the lungs and reducing the number of allergens that enter. Breathing through the nose produces nitric oxide, which helps to absorb oxygen and to disinfect the air. Breathing through the nose strengthens the immune system by activating the production of immunoglobulins. Nasal breathing contributes to the proper development of the upper airways and related structures (e.g., anatomical skeletal and dental growth).

Most people exhale through the nose, but there are people whose bodies compensate for respiratory problems by breathing through their mouths. Most cases of mouth breathing are caused by nasal congestion and blockage because of colds, allergies, or sinus infections, with result in the body resorting to the mouth as an alternative source of oxygen. It is known that the nasal passage mucosa is covered with pollen, dust, and any other contamination during the day, which can lead to mouth breathing. Most people do not realize that they breathe through their mouths instead of their noses, especially when sleeping.

Breathing through the mouth has several disadvantages, such as negative effects on saliva in the mouth. It has been found that the best protection for the mouth against gum disease and tooth decay is saliva. Saliva is a protective liquid substance in the mouth that covers the gums and teeth. It comprises several beneficial elements, such as phosphate, bicarbonate, and calcium, which repair damage to the teeth and neutralize harmful plaque acids.

The body produces saliva to do the important job of keeping the mouth healthy. After eating, oral bacteria produce plaque, which is sticky, acidic and potentially harmful to the teeth. Saliva is extremely alkaline, and it neutralizes highly acidic plaque and helps flush out bacteria.

However, due to constant breathing through the mouth, including sleep, saliva constantly dries out and loses its natural layer of protection, which can lead to various oral health problems.

It has been found that without saliva, the mouth is exposed to bacteria, which over time increases the risk of dental caries and periodontal disease, a pathological inflammation of the gums and bone tissue surrounding the teeth [Frenkel E S, Ribbeck K. Applied and Environmental Microbiology. 2015; 81:332].

However, if gum disease is left untreated, it can turn into periodontitis, which not only causes tooth loss but is also linked to health problems such as diabetes, strokes and breathing problems.

During sleep, oral breathing decreases intraoral pH compared to normal breathing [Choi J E, et al. Journal of Oral Rehabilitation. 2016; 43:356]. This reduced pH can lead to erosion of tooth surfaces, increased tooth sensitivity to temperature, and a predisposition to tooth decay.

If one has a stuffy nose, breathing through the mouth is necessary. However, in children, mouth breathing can lead to facial deformities and crooked teeth.

Prolonged breathing through the mouth can have adverse effects on oral health in adults as well and can lead to bruxism eroding and fracturing teeth, causing malocclusions and crowded teeth.

Besides the dental consequences, mouth breathing can lead to impaired sleep breathing, which can cause headaches, snoring, neck, jaw, or ear pain, dry mouth, chapped lips, bad breath, chronic fatigue, and daytime sleepiness. Mouth breathing is directly related to many upper respiratory tract infections, especially ear, throat, and nose.

Thus, ensuring nasal breathing and keeping the mouth moist (especially during sleep) will minimize the number of complications, which remains an urgent medical task.

Mouth breathing also affects composite dental restorations.

Currently, mouth dilators are widely used in the clinic, which are intended to spread the jaws and keep the mouth open.

Using a mouth dilator provides the following effects:

1. allows one to relax the muscles and keep the mouth open for a long time without tension, which gives the doctor a comfortable treatment;
2. allows one to increase the working space, which facilitates the work of the dentist;
3. minimizes the risk of trauma to the oral mucosa during dental interventions, ensures absolute safety and hygiene;
4. does not cause any discomfort or inconvenience to the patient, even if the medical intervention is prolonged (up to 4 hours).

The disadvantages of the mouth dilator are as follows. When using a mouth dilator, breathing in and out is done mainly through the open mouth (oral type of breathing). The authors of the invention found that prolonged mouth breathing during dental manipulations over time leads to various complications.

To reduce complications during the composite restoration process, the oral cavity is periodically irrigated with water, or water-soaked absorbent cotton is placed on the surface of composite restoration to isolate the composite restoration from the negative effects of air and to keep the oral cavity moist.

The authors of the invention found that the mouth type of breathing has an extremely negative effect on composite restorations during sleep.

It has been found that restored teeth (especially in the smile area) react to oral breathing, which over time inevitably leads to complications such as:

5. micro-roughness and discoloration of the composite restoration;
6. disturbance of the aesthetics of the restored teeth in the smile zone,
7. the occurrence of micro and macro cracks, micro and macro fractures;
8. micro wearability of composite restorations and dental hard tissues;
9. the surface of composite restoration becomes matt and loses its luster.

Hence, in order to keep the oral cavity moist and reduce complications, it is traditionally recommended to maintain good oral hygiene and nasal lavage.

Traditionally, salt solution (isotonic chloride solution) is widely used for nasal irrigation. To prepare the salt solution, use only boiled or distilled water and a teaspoon of common table salt or sea salt.

To wash the nose, a container (ceramic or plastic), a soft bulb (syringe), or a large syringe for injections that pours a solution of salt are used and nasal lavage is performed. The solution is poured into the container and the head is tilted on its side, the container spout is placed in the nostril and the solution is gently poured therein. According to the principle of communicating vessels, the fluid will flow out from the second nostril. Then the same procedure is repeated, but on the other side. In this way, nasal lavage with an isotonic solution is carried out.

Normal applied salt solutions may contain excessive amounts of air, which negatively affects the properties of the solution.

Thus, in order to eliminate the above drawbacks, there is a need to create a salt solution with improved properties, that could be used for various purposes in a systematic approach to oral hygiene according to the concept of temperature equilibrium.

SUMMARY

According to the first aspect, the present invention provides a multifunctional adjustable vibrating end-tufted device for individual and professional oral care, cleaning and polishing of teeth, composite restorations, and removable and non-removable dental structures according to the concept of temperature equilibrium, the device comprises a handle having a driving mechanism and a replaceable nozzle attached to the handle and having a fixing part and a working part. The working part of the nozzle comprises bristles and is fixed in an opening of the fixing part to form an end-tuft. The opening of the fixing part has a flat-oval shape, and the front edge of the fixing part has a curvilinear shape on the side of the opening of the fixing part. The replaceable nozzle is configured to adjust a degree of impact of bristles on a surface of teeth, composite restorations or dental structures, which is to be cared, cleaned or treated depending on a pressing force applied to the replaceable nozzle, and the handle is configured to transmit vibration generated by the driving mechanism to the working part of the replaceable nozzle.

The proposed device design provides high efficiency and effectiveness in oral hygiene care. In particular, its use allows one to perform cleaning of hard-to-reach areas of the oral cavity without damaging soft tissues, allows one to create the most stable, smooth (glossy) wear-resistant surface of teeth, composite restoration or dental structure, and its use allows one to perform gentle massage of the gums.

The flat-oval opening of the fixing part and the curved leading edge of the fixing part set the configuration of the working part so that when the working part is applied to the surface of teeth, composite restoration, or dental structures, which it to be cared, the working part covers it tightly and ensures uniform pressure and degree of cleaning action on all its parts. Tight coverage of the bristles on the surface of teeth, composite restorations or dental structures, which is to be cared, is also ensured by pressing on the replaceable nozzle. In particular, changing pressing force on the replaceable nozzle allows one to adjust the coverage by the working part of the surface of the oral cavity, the tooth, which is to be cared, and the degree of impact of the bristles thereon.

The proposed device design also includes a driving mechanism that generates vibration transmitted to the working part, which promotes efficient cleaning and polishing of teeth, composite restorations, and dental structures. The proposed vibrating toothbrush allows one to reduce the cleaning time, and the effort applied to the working part and the teeth. So, for example, to clean the vestibular surface of teeth, it is enough to apply the working part of the proposed vibrating brush with such pressure on the replaceable nozzle that the bristles completely cover the vestibular surface of the teeth, and further cleaning can be provided only by vibration transmitted to the bristles. The proposed device is especially indicated for people with limited hand or arm movement, such as the disabled or elderly, and is useful for children, people with disabilities, or the elderly, who have difficulty cleaning their teeth thoroughly with a regular toothbrush.

End-tufted vibrating brush with thin and flexible bristles for children provides: atraumatic and effective cleaning of teeth, preservation of enamel of growing teeth, gentle treatment of sensitive gums and teeth, cleaning hard-to-reach areas under the braces or other dental systems without damage to the braces and teeth.

Covering and surrounding the tooth with the bristles of the working part and the vibration transmitted by the driving mechanism of the device does not require active movement of the working part, which reduces the erosion of tooth enamel or dental structures, and damage to the soft tissues of the oral cavity. In addition, the elimination of active motion of the working part also reduces abrasion of the working part bristles themselves, which increases the wear resistance of the working part and allows one to change the replacement nozzle less often than usual, thus reducing waste and pollution in the environment.

The front edge of the fixing part on the side of the fixing part opening can have a concave shape, which allows cleaning the tooth surface facing the outside of the mouth, i.e. the vestibular surface of teeth, with particular care.

The front edge of the fixing part on the side of the fixing part opening can also have a convex shape, which allows the lingual and palatine surfaces of the anterior tooth groups to be cleaned with the utmost care.

The degree of impact of the bristles on the surface of teeth, composite restorations, or dental structures, which is to be cared, for can increase with an increase in the pressing force on the replaceable nozzle. Pressing force should be understood as the degree of impact of the bristles on the surface of the teeth, composite restorations, or dental structures, which is to be cared, and the contact area of the bristles with it.

The working part of the replaceable nozzle can be configured to open the bristles so that the contact area of the lateral parts of the bristles with the surface of the teeth, composite restorations, or dental structures, which is to be cared, can increase by up to 25 times compared to the area of the working part before opening the bristles, which contributes to increased efficiency and increased cleaning speed of the surface of the teeth, composite restorations, or dental structures, which is to be cared.

The fixing part can be arranged at an angle relative to the rest of the replaceable nozzle. The fixing part can also be configured to change inclination relative to the rest of the replaceable nozzle.

Different nozzle sizes allow for effective cleaning and polishing for children and adults depending on their oral hygiene status. The small parameters of the vibrating brush head, curved at an angle of 450 to 180°, provide effective cleaning and polishing of composite dental restorations in hard-to-reach areas.

The front edge of the fixing part can be made of elastic material, which eliminates trauma to the surface of teeth, composite restorations, dental structures, and oral mucosa.

The bristles can be straight or wave-shaped. The front edge of the vibrating brush's curved, flexible, thin "U" shaped bristles requires no rounding, grinding, or polishing. They easily penetrate to the following places: periodontal sulcus, gingival pockets and the cervical area, which needs especially thorough cleaning, and provide high efficiency of cleaning and polishing of these areas, while not injuring the enamel of teeth and periodontium.

The thickness of the bristles can range from 0.01 mm to 0.09 mm, preferably from 0.04 mm to 0.09 mm.

According to the second aspect, the present invention provides a method for cleaning and polishing teeth surfaces, composite restorations, and removable and non-removable dental structures using the proposed device. The indicated method provides a systematic approach and includes steps wherein: heating the toothpaste and the replaceable nozzle to a common body temperature; applying the toothpaste to the working part of the replaceable nozzle; placing the working part of the replaceable nozzle on the surface of tooth, composite restoration or dental structure such that the longitudinal axis of the working part of the replaceable nozzle is perpendicular to the surface of the tooth, composite restoration, or dental structure or close to such position; pressing the working part of the replaceable nozzle so that side parts of the bristles make at least partial or complete contact with the surface of tooth, composite restoration or dental structure; actuating the driving mechanism to generate vibration of the working part of the replaceable nozzle; holding the working part of the replaceable nozzle substantially stationary against the tooth, composite restoration or dental structure within its surface boundaries, or moving the working part of the replaceable nozzle along the vertical axis of the tooth, composite restoration or dental structure within its surface boundaries, and performing mouthwash with a liquid heated to body temperature.

At the same temperature as the two bodies, there is no heat exchange between them because the bodies are in a state of thermal equilibrium. Thus, thanks to the fact that before tooth cleaning, the toothpaste, the working part of the nozzle and mouthwash liquid are preheated to a common body temperature, the temperature equilibrium between these means and the oral cavity is provided. The proposed tooth cleaning method eliminates temperature stress on the surface of teeth, removable, non-removable dental structures, and the rest of the oral cavity when cleaning them. This reduces trauma to the surface of teeth, removable, non-removable dental structures, which increases their lifespan and reduces discomfort to the rest of the oral cavity.

The degree of impact of the bristles on the surface of a tooth or dental structure is regulated by the pressing force on the replaceable nozzle through changes in pressure from the user on the handle of the multifunctional adjustable vibrating device. In particular, when pressing the replaceable nozzle, the working part, which is end-tufted, opens so that the surface of teeth or dental structures is cleaned by the side parts of the bristles, which eliminates even the appearance of micro-roughening. When pressing on the replaceable nozzle, the working part takes a concave shape, i.e., the shape that repeats the convex parts of the surfaces of teeth or dental structures, covering them.

The front edge of the fixing part of the replaceable nozzle, which has a curvilinear shape, also facilitates coverage of the cleaned tooth surface or dental structure because it is similar to its shape. The front edge, which has this shape, guides the bristles evenly to the central part of the tooth surface and to its lateral areas adjacent to the interdental spaces, thus tightly covering the entire surface of tooth or dental structure to be cleaned. This dense coverage of the bristles in all areas of the surface to be cleaned provides an even degree of impact of the bristles on it, which allows, without applying excessive pressure to the bristles, to remove plaque from all areas of the surface of tooth or dental construction.

Thus, by holding the working part of the replaceable nozzle substantially stationary against the tooth or dental structure within its surface boundaries, it is possible to ensure equally effective cleaning of plaque in the central and lateral areas, such as the vestibular surface of the tooth, including the interdental spaces.

Also, the movement of the working part of the replaceable nozzle along the vertical axis of the tooth or dental structure increases the impact area of the bristles on its surface, which accelerates the cleaning of plaque.

Thus, the even degree of action of the bristles applied to all areas of the surface of the tooth allows one to not use additional pressing force for cleaning, for example, the sides of the tooth and interdental spaces, which eliminates trauma to the gums and erosion of tooth enamel while not losing the quality of cleaning. The use of a combination of vibration, the side parts of the bristles and the curved front edge of the fixing part of the replaceable nozzle allows one to tightly cover the surface to be cleaned with minimal movement application of the replaceable nozzle and ensure quality cleaning while making the process as easy as possible. At the same time, using the teeth cleaning method according to the concept of temperature equilibrium allows to eliminate the temperature stress on the surface of the teeth, removable and non-removable dental structures, and the rest of the oral cavity during their cleaning, which positively affects their functioning and durability.

According to another aspect, the present invention provides a vibration-mechanical preparation method of a vibrationally bi-activated salt solution, the method including: performing a vibration impact on water, bringing the water that has passed the vibration impact to the boil, salt to the boiled water to obtain a homogeneous salt solution by stirring the salt in the water, and performing the vibration impact on said salt solution. In this method, it is possible that, when performing the vibration impact on the water or the salt solution, a container with the water or the salt solution is placed on a vibrating table, and the vibration impact on said container with the water or the salt solution is performed.

According to another aspect, the present invention provides a container for a vibrationally bi-activated salt solution, wherein the outer surface of the container has a form such that a vibration device can be mounted on the container. This container can additionally comprise a spout for pouring the salt solution into a nostril.

BRIEF DESCRIPTION OF THE DRAWINGS

The essence of the invention is explained in more detail with reference to the accompanying drawings:

FIG. 1: a handle of an end-tufted vibrating toothbrush, according to one of the embodiments of the present invention;

FIG. 2: a handle of an end-tufted vibrating toothbrush with a driving mechanism and a power supply unit installed therein, according to one of the embodiments of the present invention;

FIGS. 3A-3C: end-tufted vibrating toothbrush with replaceable nozzle, according to one of the embodiments of the present invention;

FIGS. 4A-4E: a replaceable nozzle with a working part and a retaining part arranged at different angles regarding to the rest of the replaceable nozzle, according to one of the embodiments of the present invention;

FIGS. 5A-5H: cross-sections of the bristles of the working part, according to one of the embodiments of the present invention;

FIGS. 6A-6B: a shape of the working part bristles, according to one of the embodiments of the present invention;

FIGS. 8A-8D: a replaceable nozzle with a concave shaped front edge of the fixing part without a working part, according to one of the embodiments of the present invention;

FIGS. 9A-9C: a replaceable nozzle with a concave shaped front edge of the fixing part with a working portion, according to one of the embodiments of the present invention;

FIG. 10: a replaceable nozzle with the concave-shaped front edge of the fixing part, arranged parallel to the horizontal axis of the tooth, without the working part, according to one of the embodiments of the present invention;

FIG. 11: a replaceable nozzle with the concave-shaped front edge of the fixing part, arranged parallel to the horizontal axis of the tooth, without the working part, according to one of the embodiments of the present invention;

DETAILED DESCRIPTION OF THE INVENTION

Figure 7A:
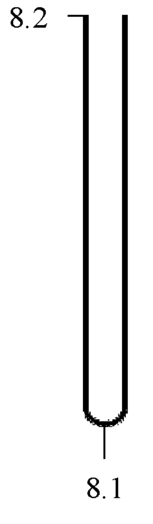
FIGS. 7A-7B: a shape of the U-shaped bristles of the working part, according to one of the embodiments of the present invention.

It should be noted that in this description, references to teeth refer not only to human teeth but also to the teeth of any animals possessing teeth, particularly domestic animals such as cats, dogs, rabbits, ferrets, etc. Nonclinical or clinical dental care for both humans and animals is carried out according to the concept of temperature equilibrium by M. L. Melikyan.

It should be noted that when an abrasive solution for cleaning and polishing teeth, composite restorations, and dental structures is mentioned in the present description, a bioactive saline solution is meant, which, when interacting with the surface of the teeth, composite restoratives, and dental structures, maintains a smooth, glossy surface.

In addition, this description mentions the concept of temperature equilibrium according to M. L. Melikyan, a brief description of which is given below.

It is known that the temperature of the teeth corresponds to the temperature of the body. For individual and professional tooth cleaning and polishing, a toothbrush, toothpaste, polishing paste, and water, whose temperature corresponds to the room temperature, are used. In other words, individual and professional tooth cleaning and polishing are done in a heat exchange conditions.

According to the laws of physics, if the temperatures of bodies are different, there will be an exchange of energy, or heat transfer, when thermal contact is established between them. Heat transfer is the transfer of heat from a more heated body to a less heated body until their temperature is the same. It takes sometime for the temperature of the bodies to equalize and remain unchanged. At the same temperature as two bodies, there is no heat exchange between them because the bodies are in a state of thermal equilibrium.

If tooth cleaning is done in a heat exchange condition, it can adversely affect dental health. In this regard, a systematic approach to oral hygiene according to the concept of temperature equilibrium according to M. L. Melikyan, according to which preheating of water (used for mouthwash), toothpaste, polishing paste, the working part of the brush, various liquids (rinses), medicinal solutions for irrigation, etc.) to a common body temperature is performed.

It should be noted that the above concept of temperature equilibrium according to M. L. Melikyan could be used not only in dentistry but also in other fields of medicine, wherein consideration of temperature equilibrium can be useful.

The proposed multifunctional adjustable vibrating device aims to solve the above problems and provide effective individual and professional oral care, cleaning or treatment of tooth surfaces and removable and non-removable dental structures according to the concept of temperature equilibrium. In the present description, said device can also be referred to as an oral care device, which implies that the proposed device can be used for all the above purposes. In addition, in this description, oral care means, but is not limited to, personal and professional oral care, cleaning or treating (polishing) the surfaces of teeth and removable and non-removable dental structures.

It is worth noting that the proposed oral care device in the following description will be considered as an end-tufted vibrating toothbrush used, in particular, for the atraumatic single-step cleaning method of natural teeth. It stands to mention that in another embodiment, the proposed end-tufted toothbrush can be used for cleaning of removable and non-removable dental structures, cleaning the tongue, professional polishing of natural teeth and dental structures or a similar treatment method, restoring the aesthetics of composite restorations, and massaging the gums.

FIG. 1 shows an end-tufted toothbrush, which comprises a handle 1 made of a metal or non-metal hollow body 2, which in cross-section can have a circular or oval shape. In a preferred embodiment, the outer diameter of the handle is up to 20 mm, the length is up to 10 cm, and the wall thickness of the body 2 of the handle 1 is up to 1.5 mm.

The body 2 of the handle 1 comprises a front portion 2.1 and a rear portion 2.2 as shown in FIG. 2. In the front part 2.1 a driving mechanism 3, such as a vibration motor is arranged, providing a frequency of, for example, 1000 Hz, and a switch to start the driving mechanism. In the rear part 2.2 of the housing 2 of the handle 1, a power supply unit is arranged, for example, which is a battery 4. The body 2 of the handle 1 also comprises a toothbrush activation button. On the outer surface of handle 1 is partially or completely rubberized (FIG. 3A), which provides a comfortable position of the toothbrush in the hand. The rubberized surface has special anti-slip inserts.

After installing the battery 4 into the hollow body 2, the end part of the handle 1 is tightly closed by a metal or non-metallic plug 5 (FIG. 2). For this purpose, threads can be made at the end part of the housing 2 and on the plug 5. The plug 5 closes an opening on the end part of the housing 2 and locks the battery 4 in a position inside the housing 2. To replace the battery 4, the plug 5 is unscrewed and the battery 4 is removed. After replacing the battery, the plug 5 is screwed into the housing 2 of the handle 1.

The replaceable nozzle 6 is attached to the neck 7 of the front part 2.1 of the body 2 of the handle 1, as shown in FIGS. 3B and 3C. Said neck 7 can be metallic or non-metallic, hollow or non-hollow, cylindrical or oval in shape. Preferably, the length of the neck 7 is up to 6 cm and the diameter of the neck is up to 7 mm, which corresponds to the inner diameter of the replaceable nozzle 6.

Conventionally, the neck 7 is divided into two parts, namely the front part 7.1 and the rear part 7.2. On the outer surface of the front part 7.1 of the neck 7, a circular ledge at an angle of 900 is formed, having a length of 3 cm and a height of up to 0.5 mm. The ledge is designed for reliable fixing of the replaceable nozzle 6 (FIGS. 3A and 3B). The ledge can also be made in a truncated shape.

The replaceable nozzle 6 is made of a metal or non-metal hollow body, cylindrical or truncated in shape. Preferably, the wall thickness of the replaceable nozzle 6 is up to 0.3 mm, the length is up to 6 cm and the inner diameter is up to 7 mm. Depending on the task at hand, the length and diameter of the replaceable nozzle 6 can be varied either upward or downward. The inner diameter of the rear part 6.2 of the replacement nozzle 6 shall match the outer diameter of the front part 7.1 of the neck 7 (FIGS. 3B and 3C).

The front part 6.1 of the replaceable nozzle comprises the working part 8 and the fixing part 9 (FIGS. 4A-4E). To ensure cleaning even the most hard-to-reach places in the oral cavity, the fixing part 9 on the front edge 9.2 side is angled relative to the rest of the replaceable nozzle 6. The fixing part 9 can also be configured to change the angle relative to the rest of the replaceable nozzle 6, which allows one to adjust its angle to the individual characteristics of the oral cavity.

The working part 8 comprises flexible, thin, medium-hard nylon bristles assembled into an end-tuft. Artificial nylon bristles are characterized by the fact that they are smooth, have no pores, dry quickly, and are less susceptible to the infestation of microorganisms, so they are considered safer. The cross-section of each bristle can have a different shape, for example, as shown in FIG. 5, namely circular (a), semi-circular (b), oval (c), tetrahedral (d), triangular (e), rectangular (f), polyhedral (g) and winged (h) shapes. The bristles can also be straight or wavy and mixed, as shown in FIGS. 6A and 6B. The bristles can have a length of up to 40 mm and a thickness of 0.01 mm to 0.09 mm (preferably 0.04 mm), and the bristles can have different thicknesses along their length. The long bristles are suitable for sensitive gums, while the short bristles are suitable for removing stale plaque from the chewing surface of teeth and composite restorations, for example.

Figure 7B:
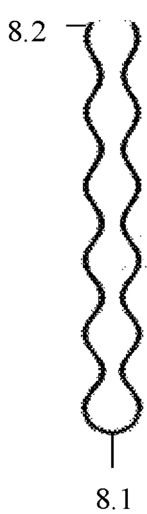

The bristles can also be U-shaped, as shown in FIG. 7, and can be up to 20 mm long. The length of the bent bristle is the distance from the bend point 8.1 to the free ends 8.2. The free ends 8.2 of the U-shaped bristles are attached to the fixing part 9 of the replaceable nozzle 6, thus forming a loop. As a result, toothpaste or polishing paste can be held and activated inside the loop.

Figure 8A:
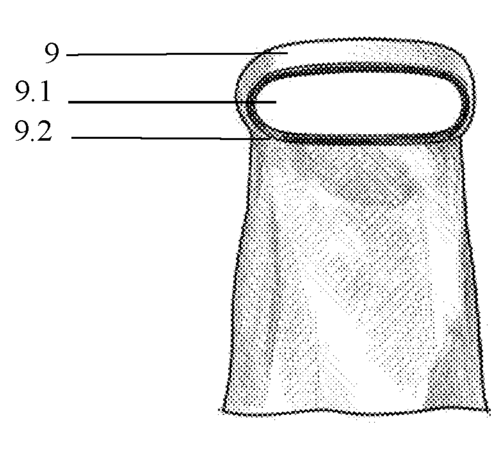
Figure 8A:
Figure 8B:
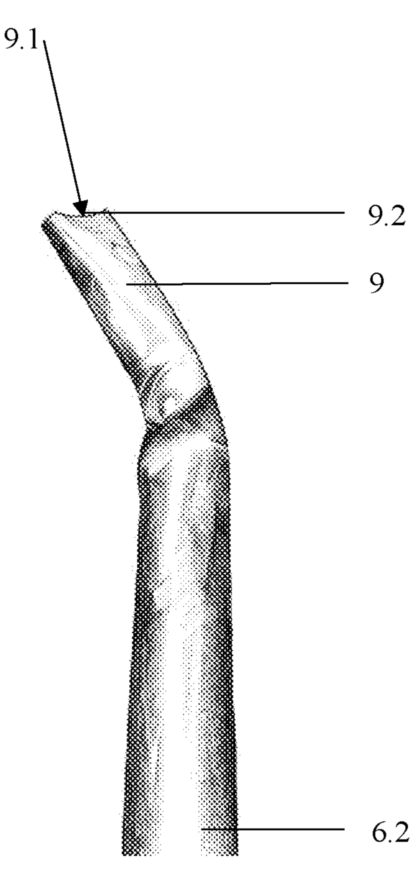

FIGS. 8A-8D show photographs of one of the embodiments of the replaceable nozzle 6 without the end-tuft. The fixing part 9 of the replaceable nozzle 6 has an opening 9.1, wherein the bristles are fixed to form a dense end-tuft (FIG. 8A). For fixing, the end-tuft is placed in the opening 9.1 of the fixing part 9 to a depth of 10 mm and is mechanically compressed, because of which the opening 9.1 of the fixing part 9 acquires a flat-oval shape up to 8 mm long and up to 2.5 mm wide. The cross-section of the end-tuft acquires a shape like the opening 9.1 (FIGS. 9A, 9B, 9C).

Then on the side of the rear part 6.2 of the replaceable nozzle 6, a glue is poured, which penetrates from the ends of the bristles to the front edge 9.2 of the fixing part 9. After drying, the adhesive ensures chemical bonding of the bristles with each other and with the inner surface of fixing part 9 of the replaceable nozzle 6, while the rear part 6.2 of the replaceable nozzle 6 remains hollow. The formed adhesive plug provides reliable fixing of the dense end-tuft inside the fixing part 9 of the replaceable nozzle 6 and prevents the bristles from falling out when cleaning and polishing teeth.

The front edge 9.2 of the fixing part 9 on the side of the opening 9.1 has a curved shape, in particular a concave shape, which allows cleaning with special care the vestibular surface of all teeth and the lingual surface of lateral groups of teeth or a convex shape, which allows cleaning with special care the lingual and palatial surfaces of anterior groups of teeth. The concave shape of the leading edge, and the convex one, is close to the reciprocal shape of the corresponding tooth surface (FIGS. 8B, 8C, 9B, 9C).

Figure 12:
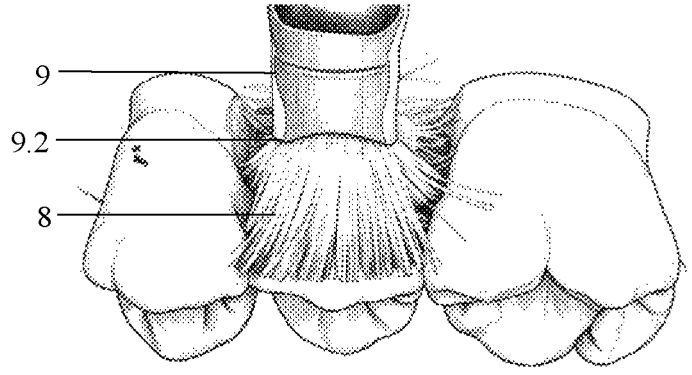
FIG. 12: a replaceable nozzle with the concave-shaped front edge of the fixing part, arranged parallel to the horizontal axis of the tooth, with the working part, according to one of the embodiments of the present invention.
Figure 13:
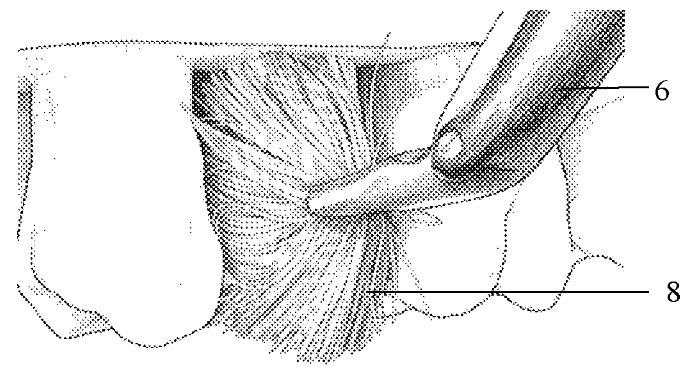
FIG. 13: a replaceable nozzle with the concave-shaped front edge of the fixing part, arranged parallel to the horizontal axis of the tooth, with the working part, according to one of the embodiments of the present invention.

FIGS. 10 and 11 show an example of positioning the front edge 9.2 of the locking part 9 on the vestibular surface of the premolar in the equatorial area and parallel to the horizontal axis of the tooth so that unobstructed movement of the toothbrush along the vertical axis and blocking its movement along the horizontal axis of the tooth is ensured. It should be noted that the front edge 9.2 of the fixing part 9, because of the similarity with the shape of the vestibular surface of the tooth, provides a tight coverage of its bristles, penetrating also into the interdental space, as shown in FIGS. 12 and 13. This arrangement allows only the correct cleaning motions, the micro movement of the end-tuft along the tooth from top to bottom only, and also allows, without changing the pressing force during cleaning, to ensure cleaning of the maximum area of the tooth, which improves quality and increases the speed of cleaning, and reduces damage to the soft tissue of the oral cavity.

Figure 14:
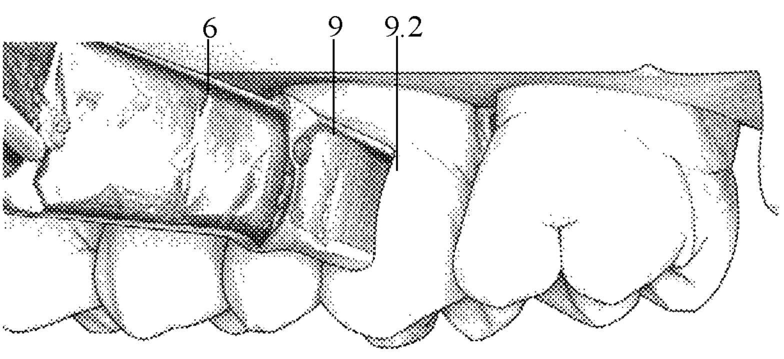
FIG. 14: a replaceable nozzle with the concave-shaped front edge of the fixing part, arranged perpendicularly to the horizontal axis of the tooth, without the working part, according to one of the embodiments of the present invention.

A toothbrush with a fixing part 9, the front edge 9.2 of which has a concave shape, can also be used to clean the teeth along their horizontal axis. Here, the front edge 9.2 of the fixing part 9 is perpendicular to the horizontal axis of the tooth or close to such a position (FIG. 14), which ensures the unimpeded movement of the brush along the horizontal axis within one tooth.

In a preferred embodiment, the working part 8 of the toothbrush has a length of 7.5 mm, a width of 8 mm, and a thickness of 2 mm, with the bristles having a U-shape. Here, the curved parts of the bristles are at the same level in the horizontal plane and form a working surface with an area of 16 $mm^2$ in this embodiment. When the working part 8 of the toothbrush is positioned perpendicular to the tooth surface and when the working part 8 is pressed toward the longitudinal axis of the bristles, the end-tuft opens as shown in FIGS. 12 and 13. Depending on the pressing force, the end-tuft can open so that the working part 8 takes the form of a truncated cone, or the bristles can incline at 180° relative to their base (FIGS. 15A-15D) and, correspondingly, increase this working surface area, as shown in FIGS. 16A-16D. The bristles are elastically deformed, which allows them to return to their original shape after the pressure is stopped, regardless of the grade of deformation. Elastic deformation refers to deformation that disappears after external forces stop acting on the body.

It is important to note that the parameters of the head's replaceable nozzle and the working part of the vibrating brush can vary both upward and downward.

The effectiveness of tooth cleaning depends mainly on the contact area (working field) of the bristles with the surface of teeth, composite restorations, non-removable, removable dental structures, or when massaging gums. When cleaning teeth with traditional toothbrushes, the working area depends on the diameter of the tips of the bristles that come into contact with the surface of the tooth. Despite the different sizes of the working parts of traditional toothbrushes, cleaning mainly involves contact between the tips of the toothbrush bristles and the surface of the tooth.

The working area of the proposed end-tuft toothbrush is determined by the contact area of the side surfaces of the bristles with the tooth surface and depends on the pressure force on the working part 8. The lateral surface area of the bristles is ten times greater than the area of their tips. The degree of impact of the bristles on the tooth surface can also be adjusted by the pressing force on the working part 8. In particular, when pressing on the working part 8, the distance between the front edge 9.2 of the fixing part 9 (the root of the bristles) and the tooth surface becomes smaller, which leads to an elastic deformation of the bristles. An elastically deformed bristle, trying to restore its non-deformed state, can, like a compressed spring, exert pressure on the tooth surface, increasing the impact on it.

One can distinguish three grades of elastic deformation of the working part 8 of the proposed toothbrush.

Grade I of Elastic Deformation of the Working Part 8 of the Proposed Toothbrush.

Figures 15A, 15B, 15C, 15D, 16A, 16B, 16C, 16D:
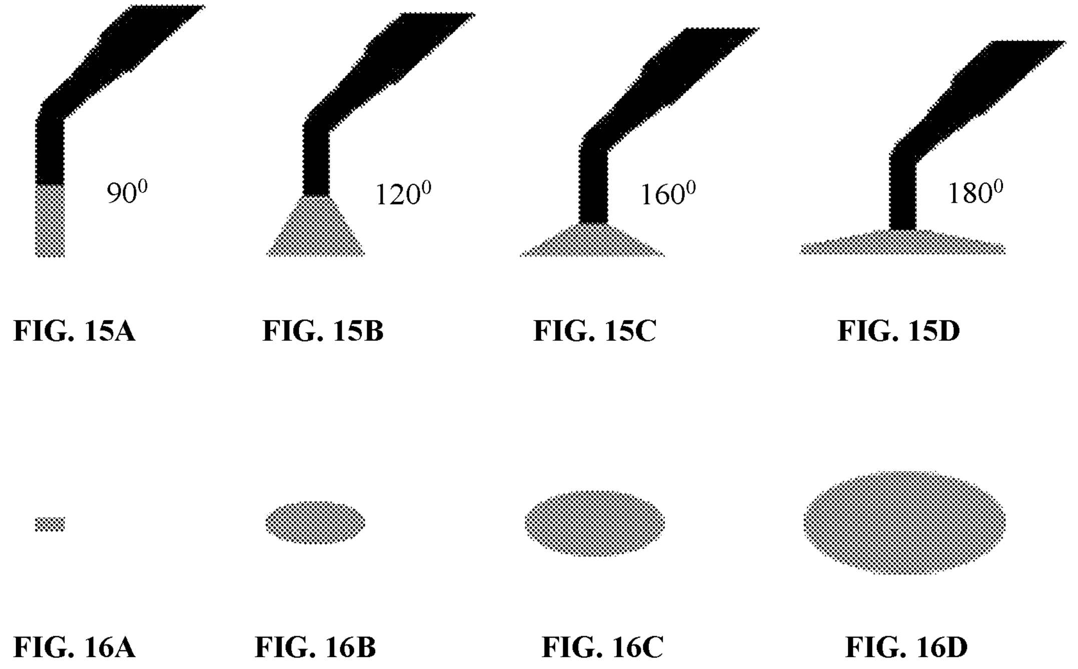
FIGS. 15A-15D: a replaceable nozzle with a working part having different grades of elastic deformation, according to one of the embodiments of the present invention.
FIG. 16A-16D: the working surface contact areas of the working part of the replaceable nozzle with the tooth surface, depending on the elastic deformation of the working part, according to one of the embodiments of the present invention.

The working part 8 of the toothbrush is set perpendicular to the surface of the tooth to be brushed (starting position), as shown in FIG. 15A. The area of contact between the brush and the tooth surface is 16 $mm^2$. With a light pressure on the replaceable nozzle, namely on the working part of the toothbrush in the vertical plane (in the direction along the longitudinal axis of the bristles), the end-tuft opens to 30%, resulting in an angle of 100 to 1200 between the bristles and the surface to be cleaned, whereby the end-tuft from a rectangular shape takes the form of a truncated cone (FIG. 15B).

After opening the end-tuft, side parts of the bristles are in contact with the surface to be cleaned, with the contacting part of the bristles being up to 2.5 mm long from the curved edge of the bristle (front segment). Because of the deformation, the working surface of the end-tuft in contact with the cleaned tooth surface takes an oval shape up to 9 mm wide and up to 14 mm long (FIG. 16B). In particular, the contact area of the working part 8 with the cleaned tooth surface is 126 $mm^2$, which is almost 8 times greater than the area of the working surface of the end-tuft in its original position (FIGS. 16A and 16B). After removing the pressure on the working part of the replaceable nozzle, the end-tuft takes its original shape because of the elastic deformation.

Grade II Elastic Deformation of the Working Part 8 of the Proposed Toothbrush.

The working part of the toothbrush is in the initial position (FIG. 15A). The area of contact of the working part 8 with the surface to be brushed is 16 $mm^2$. At medium pressure on the working part 8 of the toothbrush in the vertical plane (in the direction along the longitudinal axis of the bristles), the end-tuft opens to 60%, which results in an angle of 120 to 160° between the bristles and the surface to be cleaned, whereby the end-tuft from a rectangular shape takes the form of a truncated cone (FIGS. 15B and 15C).

After opening the end-tuft, the side surface of the bristles contacts the surface to be cleaned, whereby the length of the contacting side part of the bristles is up to 5 mm from the curved edge of the bristle (front and middle segment). Because of the deformation, the working surface of the end-tuft in contact with the surface to be cleaned takes an oval shape up to 13 mm wide and up to 18 mm long (FIGS. 16B and 16C). In particular, the contact area of the working part with the cleaned tooth surface is 234 $mm^2$, which is almost 16 times greater than the working surface area of the end-tuft in the initial position.

Because of the elastic deformation, the end-tuft assumes the original shapes after removing the pressure on the working part 8 of the replaceable nozzle.

Grade III of Elastic Deformation of the Working Part 8 of the Proposed Toothbrush.

The working part 8 of the toothbrush is in the initial position (FIG. 15A). The contact area of the working part of the toothbrush with the surface to be cleaned is 16 $mm^2$. When the working part 8 of the toothbrush is pressed forcefully in the vertical plane (in the direction along the longitudinal axis of the bristles), the end-tuft opens to 100%, resulting in an angle of 160 to 180° between the bristles and the surface to be cleaned, whereby the end-tuft from a rectangular shape takes a flattened shape (FIG. 15D). After opening the end-tuft, only the side surfaces of the bristles contact the surface to be cleaned, with a length of up to 7.5 mm (middle and back segment) of the contacting side part of the bristles. Because of the deformation, the working surface of the end-tuft in contact with the tooth surface to be cleaned takes an oval shape up to 17 mm wide and up to 23 mm long (FIG. 16D). In particular, the contact area of the working part with the surface to be cleaned is 391 $mm^2$, which is almost 25 times than greater the area in the initial position. After removing the pressure on the working part 8 of the replaceable nozzle, because of the elastic deformation, the end-tuft takes its original shape.

The choice of elastic deformation of the working part of the toothbrush depends on the hygienic condition of the surface to be cleaned. For example, Grade I of elastic deformation of the end-tuft (a light pressure on the working part of the toothbrush) can be designed, for example, for children (up to 12 years); for cleaning of temporary teeth and teeth with poorly mineralized enamel; for adults with hypersensitive teeth and with damaged dental hard tissues; for sensitive gums and bleeding gums; for people suffering from diabetes; for women during pregnancy and lactation; for inflammatory periodontal and oral mucosal diseases; after dental surgery; for tooth mobility. Thus, the proposed toothbrush replaces the traditional toothbrushes with a soft hardness at grade I of elastic deformation of the end-tuft.

Grade II of the end-tuft elastic deformation (medium pressure on the working part of the brush) can be designed for adults and children over 12 years old with healthy teeth and mucosa. Grade II end-tuft deformation provides effective plaque removal without causing pain or discomfort. Thus, the proposed toothbrush replaces the traditional toothbrushes with a medium hardness at the grade II elastic deformation of the end-tuft.

For example, Grade III elastic deformation of the end-tuft (firm pressure on the working part of the toothbrush) may be intended, for example, for people with a tendency to increase the formation of mineralized and non-mineralized dental plaque; for effective cleaning of removable dentures or braces or other orthodontic devices; for smokers, fans of strong tea or coffee; and those people whose lifestyle and professional activities lead to the formation of heavy dental plaque. Thus, the proposed toothbrush replaces the traditional rigid toothbrushes at the grade III elastic deformation of the end-tuft.

Consequently, the proposed toothbrush can be adjusted according to the health and hygiene of the teeth, the age of the user, and other indicators that require an individual approach.

The flexible, thin synthetic bristles of the working part, 0.04 mm thick, assembled into an end-tuft, maximize the cleaning and polishing ability of the proposed vibrating toothbrush. Using the sides of the smooth, fine bristles to clean the mouth has the following positive effects:

- eliminates mechanical damage (scratches and roughness) and artificial wear of enamel, which is especially important for patients with periodontitis, sensitive teeth, signs of enamel erosion, manifestations of hypersensitivity, wedge-shaped defects, and gum recession (attrition);
- excludes trauma to the surface of composite restorations, dental structures, and oral mucosa;
- provides a stable glossy surface after cleaning and polishing of the teeth;
- ensures maximum contact of the working part with the surface of the tooth or composite restoration, with a minimum size of the end-tuft;
- eliminates trauma to the periodontium when cleaning the periodontal sulcus, gingival pockets and cervical area.

The proposed end-tufted vibrating toothbrush allows therapeutic, coronal, cosmetic, superficial, or selective polishing of teeth, removes plaque from the teeth surface more effectively than a conventional toothbrush.

Different replaceable nozzles can be used for each shape of the front edge of the fixing part or for specific tasks during tooth cleaning or polishing. Replaceable nozzles are available in a variety of sizes, allowing for effective cleaning and polishing for children and adults. The small parameters of the replaceable nozzle of the vibrating toothbrush, curved at an angle of 450 to 180°, allow effective cleaning of teeth and polishing of composite dental restorations in hard-to-reach areas.

Replaceable nozzles can be made of both plastic and metal. Using a metal thin replaceable nozzle is preferable because metal is not as harmful as plastic, which does not decompose for several thousand years. The front edge of the fixing part can be made of elastic material to prevent trauma to the gums or other parts of the mouth.

Advantages of the proposed adjustable vibrating brush:

- does not produce a noise like rotating cleaning and polishing tools;
- provides cleaning and polishing without pressure on the surface of teeth, composite restorations and dental structures;
- thin, flexible artificial bristles of the end-tufted brush are extremely flexible and have unprecedented cleaning and polishing capabilities;
- provides highly effective cleaning and polishing of hard-to-reach areas compared to rotating devices, which dramatically minimizes the likelihood of periodontal complications;
- provides a high level of cleaning and polishing by increasing the self-adjusting working field of the end-tuft with the surface of composite restorations and dental structures compared to traditional cleaning and polishing instruments;
- improves the sliding of the bristles on the surface of composite restorations and dental structures, and provides a fast, effective and atraumatic method of cleaning and polishing;
- replaces three traditional toothbrushes: soft, medium, and hard brushes;
- provide a uniform atraumatic cleaning and polishing of the composite restoration;
- reduces the consumption of toothpaste and polishing paste, saving time and money for the patient;
- is also used for massaging the gums.
- thin metal nozzles with small dimensions do not pollute the environment and are not as harmful compared to the usual plastic brush, which decays over 4 thousand years.

The vibrating brush is indicated for people with limited hand or arm movement, such as the disabled or elderly. The low cost of nozzles allows one to save money.

The proposed end-tufted toothbrush can be used in the proposed tooth cleaning method, dental structures, and composite restorations according to the concept of temperature equilibrium according to M. L. Melikyan Individual hydrothermal-vibrational cleaning according to the temperature equilibrium concept of M. L. Melikyan is carried out as follows.

Warm water is poured into the glass, the temperature of which corresponds to the normal body temperature. Place a tube of toothpaste in warm water with the cap down and a removable nozzle, namely its working part. After a few minutes, take the tube of replacement nozzle out of the water and apply a portion of toothpaste heated to body temperature to its heated working part. The tube of toothpaste is placed back in the glass with warm water with the cap down.

The working part of the toothbrush with the heated toothpaste is placed on the vestibular surface of the tooth so that the longitudinal axis of the working part is perpendicular to the vestibular surface of tooth or close to such a position. Depending on the state of dental hygiene, choose grade I, II, or III of elastic deformation of the end-tuft. Next, the working part is pressed so that the end-tuft opens to the desired degree. The opening of the end-tufted brush implies that the side parts of the bristles will be at least partially in contact with the tooth surface. Then the driving mechanism is actuated to generate the vibration transmitted to the working part.

While cleaning the teeth, the heated portion of the toothpaste is placed between the working part of the toothbrush and the surface of tooth. It should be noted that the hydrothermal vibrating cleaning is not carried out by the tips of the bristles, and its side surfaces, which multiply the contact area of the bristles with the surface of the tooth and ensure its effective cleaning.

It should be noted that using U-shaped bristles in the hydrothermal-vibratory method of cleaning or polishing promotes the retention of toothpaste or polishing because the paste is perfectly mixed with saliva and warm water to the state of activated fine foam (oxygenated), which helps soften plaque and improve the sliding of the bristles on the surface of teeth, composite restorations, fixed and removable dental structures (which are made of dissimilar artificial materials). In addition, the resulting foam provides a fast, efficient, and atraumatic way to form a smooth (glossy) wear-resistant surface. Providing a smooth tooth surface slows the adhesion (sticking) of bacteria and the formation of new plaque and dental tartar.

The U-shaped bristles also hold heated toothpaste or polishing paste between the end-tuft and the tooth surface during cleaning or polishing, which reduces toothpaste or polishing paste consumption by at least 4 times while providing high cleaning efficiency. The front edge of the U-shaped bristles does not need to be rounded, sanded or polished. The bristles of the proposed shape easily penetrate the gingival sulcus, gingival pockets and cervical areas (which need especially thorough cleaning) and provide high efficiency in cleaning and polishing these areas, while not injuring the enamel of teeth and periodontium.

Cleaning begins with the outer (vestibular) surface, then the chewing and inner (lingual) surfaces of the upper jaw, and the lower jaw teeth are brushed similarly. The working part of the nozzle moves along the vertical axis of the tooth within the boundaries of its surface. To clean the interdental spaces, no additional force is required on the end-tuft because the curved front edge of the fixing part guides the bristles evenly into all parts of the tooth. After scratching the teeth, rinse with water whose temperature corresponds to the body temperature. The hydrothermal-vibrational tooth cleaning method according to the concept of temperature equilibrium by M. L. Melikyan is performed twice a day for three minutes.

It should be noted that for cleaning the teeth surface, it is also possible for the working part of the replaceable nozzle to be held substantially stationary against the tooth or dental structure within its surface boundaries, without losing cleaning quality. This option may be suitable for people with disabilities, the elderly, and for use by children. The suggested toothbrush can be used without toothpaste at the beginning of children's teeth-cleaning training, which eliminates swallowing. In addition, the proposed toothbrush is easy to use compared to traditional cleaning techniques, and if cleaning a child's teeth on their own is not yet possible, parents can easily ensure their child's oral hygiene.

After each cleaning procedure, the working part of the toothbrush is thoroughly washed (laundry soap is recommended) and then placed in a special bowl to dry. The end-tufted toothbrush has at least a one-year shelf life. The small size of the replaceable nozzle and the minimum size of the working part of the replaceable nozzle provides effective dental hygiene in hard-to-reach areas, including under the braces, and unlike electric and ultrasonic toothbrushes, the proposed vibrating end-tuft does not cause discomfort when cleaning teeth and dental structures.

Thus, the above method performs an individual hydrothermal-vibrational tooth cleaning method using an adjustable vibrating toothbrush according to the concept of temperature equilibrium by M. L. Melikyan.

It is now established that the smooth, stable, glossy surface of teeth makes it difficult and slows down the adhesion of bacteria, the formation of new plaque and tartar to the polished surface of teeth for a long time.

Below is a description of a customized hydrothermal-vibrational polishing method for teeth, dental structures, and composite restorations according to the concept of temperature equilibrium by M. L. Melikyan To perform the above method, one can use the proposed adjustable vibrating end-tufted toothbrush and polishing paste (fine or ultrafine), which are used for professional tooth polishing.

The working part of the toothbrush and polishing paste are preheated in a glass with warm water to body temperature. Tooth polishing is carried out in the same way as the hydrothermal-vibrational method described above, only with the difference that instead of heated toothpaste, they use heated fine-grained or ultrafine-grained polishing paste. After polishing, rinse the mouth with water heated to body temperature.

Professional single-step tooth cleaning and polishing is performed by the dentist in the same way as the individual hydrothermal-vibrational cleaning and polishing method described above.

Thus, the individual and professional hydrothermal-vibrational tooth cleaning and polishing methods according to the concept of temperature equilibrium provide the following beneficial effects:

- allows atraumatic cleaning and polishing of teeth with a single device;
- improves the gliding of the bristles on the teeth surface and provides effective plaque removal and polishing compared to traditional toothbrushes;
- provides fast tooth surface cleaning and polishing, because of the increased contact area of the end-tuft with the tooth surface compared to traditional toothbrushes;
- makes it difficult and slows down the adhesion of bacteria and the formation of new plaque and tartar to the polished surfaces of teeth;
- minimizes abrasion of the bristles, which increases the service life of the vibrating toothbrush's working part by at least one year compared to traditional toothbrushes;
- eliminates trauma to the periodontium, oral mucosa and tooth enamel compared to traditional brushes;
- minimizes the formation of micro-roughness on the tooth surface, which leads to the retention of dyes and impaired aesthetics;
- minimizes the likelihood of artificial wear of the natural hard tissues of the teeth;
- minimizes the likelihood of recession (loss of gingiva), the occurrence of gingivitis;
- makes it easier to keep the mouth clean and healthy;
- minimizes the number of visits to the doctor, which saves time for both the patient and the doctor;
- is completely safe for dental implants, veneers, crowns, fixed and partial removable and full removable dentures, orthodontic constructions, braces.

The proposed end-tufted toothbrush can be used in an atraumatic individual hydrothermal-vibrational polishing method for composite restorations according to the concept of temperature equilibrium by M. L. Melikyan, which is described below.

Before polishing a composite restoration, it is individually brushed using a vibrating brush and toothpaste according to the concept of temperature equilibrium by M. L. Melikyan described above.

Then proceed to individual polishing of the composite restoration, using a self-adjusting vibrating toothbrush and fine or ultrafine polishing paste, which is used for professional polishing of composite restorations. Composite restorations are polished according to the concept of temperature equilibrium by M. L. Melikyan.

Warm water is pre-pored into the glass, the temperature of which corresponds to body temperature. A tube of polishing paste and the working part of the brush are placed in a cup with warm water. After a few minutes, the brush is removed from the water and a portion of the polishing paste heated to body temperature is applied to its working end and the hydrothermal-vibrational polishing method of composite restorations is started. First polish the composite tooth restoration of the upper jaw and then the lower jaw.

The working edge of the toothbrush with heated polishing paste is placed on the vestibular surface of the composite restoration so that the longitudinal axis of the working part of the brush is perpendicular to the vestibular surface of the tooth.

Next, pressure is applied to the working part of the brush, and because of the deformation of the bristles, the end-tuft opens. Depending on the coloring of the outer surface of composite restoration, polishing is performed for grade II or grade III end-tuft deformities.

Next, the vibrator is turned on and the hydrothermal-vibratory polishing method of the composite restoration is started. During polishing, the heated portion of the polishing paste is placed between the working field of the vibrating brush and the outer surface of the composite restoration. The hydrothermal-vibratory polishing method is carried out not by the tips of the bristles but by their side surfaces, which multiplies the contact area of the end-tuft with the tooth surface and ensures high polishing efficiency of composite restorations.

Conduct micro-circular motions of the working part of the brush on the surface of the restored tooth without effort on the end-tuft.

Polishing begins on the vestibular surface of the composite restoration, then proceeds to the masticatory and oral surfaces of the composite restoration. During the polishing process, water washing is performed, which temperature corresponds to the body temperature.

Individual atraumatic hydrothermal-vibrational polishing of composite restorations according to the concept of temperature equilibrium is performed twice a month.

After polishing, the working part of the vibrating brush is thoroughly washed (household soap is recommended) and then placed in a special bowl to dry. The vibrating end-tuft has a lifespan of up to 12 months.

The proposed end-tufted toothbrush can also be used in a single-step professional hydrothermal-vibrational polishing process for composite dental restorations according to the concept of temperature equilibrium.

The dentist performs the professional single-step hydrothermal-vibrational polishing of the composite restoration as the individual hydrothermal-vibrational polishing of the composite restoration described above.

Thus, a single-stage system for individual and professional preventive polishing of composite restorations has been developed that provides perfect aesthetics and a smooth, glossy surface with a consistent shine and wear resistance.

The proposed end-tufted toothbrush can also be used in a single-step professional hydrothermal-vibrational polishing method after layer-by-layer composite tooth restoration according to the concept of temperature equilibrium.

The last step in layer-by-layer composite dental restorations is finishing grinding and polishing, for which grinding and polishing tools are used. In other words, a multi-step method of grinding and polishing the composite restoration is carried out.

The developed professional hydrothermal-vibrating single-step method allows for carry out finish polishing (after the traditional method of grinding).

The single-step professional hydrothermal-vibrational polishing of a restored tooth after a traditional layer-by-layer composite tooth restoration is performed similarly to the single-step professional hydrothermal-vibrational polishing method of a composite restoration according to the concept of temperature equilibrium by M. L. Melikyan, described above.

Thus, the developed hydrothermal-vibrational method allows a professional single-stage polishing of composite restorations at the finishing stage of layer-by-layer composite dental restoration and after composite restoration.

The advantages of a customized professional single-step hydrothermal-vibratory cleaning and polishing method for composite restorations include:

- provides the formation of high aesthetics and maintains a perfectly smooth, stable, glossy and wear-resistant surface of composite restorations;
- substantially minimizes the formation of biofilm and the accumulation of dyes on the glossy surface;
- makes it difficult and slows down the adhesion of bacteria and the formation of new plaque and tartar on polished surfaces;
- does not traumatize the surface of composite restoration and maintains high wear resistance;
- allows one to abandon the professional multi-step method of cleaning and polishing composite restorations, which saves time and money for the patient;
- provides and maintains the aesthetics of composite restorations, which are as good as those of natural teeth, and the polished surface of composite restorations looks the same as normal tooth enamel;
- does not traumatize the periodontal and oral mucosa tissues and minimizes the likelihood of recession (gum recession);
- expands using composite restorations in the smile zone, which reduces using traditional designs with traumatic and aggressive methods of tooth preparation;
- minimizes the number of complications and increases the functioning time of the composite restoration;
- saves time and money for patients, reduces the number of visits to the doctor for professional polishing of composite restorations.

Professional single-step cleaning and polishing can reduce the time and cost to the clinician for cleaning and polishing tools.

Further, the proposed end-tufted toothbrush can also be used in a single-step individual and professional hydrothermal-vibrational method of cleaning and polishing dental structures according to the concept of temperature equilibrium.

Over time, dental treatment and dentures result in fixed and removable dental structures that are made solely from dissimilar artificial materials in the mouth. These structures differ from each other not only in physical and chemical properties but also in the susceptibility of the biofilm to staining. In order to function, these structures constantly need individual and professional care.

The developed adjustable vibrating brush and hydrothermal-vibrating method allow individual, professional cleaning and polishing of fixed and removable dental structures according to the concept of temperature equilibrium by M. L. Melikyan.

Individual and professional cleaning and polishing of dental restorations is performed as the individual and professional cleaning and polishing methods of composite restorations described above.

Depending on the condition of the biofilm and staining, cleaning and polishing of dental structures is carried out for I, II, or III grade of the end-tuft deformities.

The advantages of the individual and professional single-step hydrothermal-vibratory cleaning and polishing method for fixed and removable dental structures:

- provides a high level of atraumatic polishing because of the side surfaces of the fine, smooth end-tuft bristles;
- is completely safe for dental implants, veneers, crowns, fixed and partial removable and full removable dentures, orthodontic constructions, braces;
- makes it difficult and slows down the adhesion of bacteria and the formation of new plaque, soft and hard stone, and staining the polished surface for a long time;
- provides a high level of polishing, smoothness, and cleanliness of dental structures,
- allows for highly effective individual cleaning and polishing at home, which is an alternative to professional polishing.

The developed single-stage system and the professional hydrothermal-vibratory cleaning and polishing method for dental structures allow obtaining the smoothest stable surface with a minimum effort of tools, time and money.

The adjustable vibrating brush allows one to tooth clean, polish teeth, composite restorations, and dental constructions using activated fine foam (oxygenated) that:

- improves the sliding of bristles on the surface of teeth, composite restorations, fixed and removable dental structures (which are made of dissimilar artificial materials);
- provides a quick, efficient, and atraumatic way to form a smooth, stable, glossy, wear-resistant surface of composite restorations;
- provides the formation of a smooth surface of fixed and removable dental structures;
- softens and extremely gently cleans plaque and simultaneously polishes the tooth surface of composite restorations, protecting against the formation of tartar;
- makes it permanently difficult and slows down the adhesion of bacteria and the formation of new plaque and tartar on polished tooth surfaces, composite restorations and/or dental structures.

The design features of the vibrating brush working part and the developed hydrothermal-vibrating method allow the heated toothpaste and polishing paste to be held between the end-tuft and the tooth surface, composite restoration or dental structure during cleaning and polishing, which drastically reduces the consumption of toothpaste and polishing paste while providing high efficiency.

The benefits of a child's adjustable-vibrating toothbrush:

is recommended for children from an early age;

allows children at the initial stage of learning to brush their teeth without using toothpaste, which eliminates the possibility of swallowing toothpaste during cleaning, which is a problem for parents;

does not require any special skills in cleaning techniques compared to traditional cleaning techniques;

if dental hygiene is poor, it is recommended that teeth be brushed according to the concept of temperature equilibrium, under parental supervision;

if the child cannot brush their own teeth, then using an adjustable vibrating brush will allow parents to easily ensure the oral hygiene of the child.

The developed adjustable multifunctional end-tufted vibrating brush with three grades of deformation of the working part allows replacing three traditional toothbrushes (soft, medium and hard), and depending on oral hygiene to conduct atraumatic individual professional single-step hydrothermic-vibrating cleaning and polishing method for teeth, composite restorations, and fixed and removable dental structures according to the concept of temperature equilibrium by M. L. Melikyan that:

allows one to radically expand using composite materials in the smile zone;

ensures perfect oral hygiene;

drastically minimizes the number of complications compared to traditional individual, professional cleaning and polishing methods;

eliminates temperature stress during cleaning and polishing;

completely replaces the traditional professional multi-step cleaning and polishing of teeth, composite restorations, fixed and removable dental structures;

allows one to minimize the number of cleaning and polishing tools compared to traditional multi-step methods of cleaning and polishing teeth with minimal time and money for both the doctor and the patient;

minimizes the likelihood of microabrasion and microroughness on the surface of teeth, composite restorations, and dental structures, maintaining high aesthetics for a long time;

the parameters of the working part of the vibrating brush allow local cleaning and polishing of teeth, composite restorations and dental structures depending on the hygienic situation;

allows for individual and professional cleaning, polishing, and massage of the gums;

allows periodic cleaning and polishing of teeth and composite restorations without toothpaste using a salt solution heated to body temperature, such as 0.10% salt solution with dissolved substances heated to body temperature. If the teeth are very dirty, the temperature of the solution can be increased from 50-60 degrees.

Further, the proposed vibrationally bi-activated salt solution that can be used for various purposes, in particular for tooth cleaning and polishing, periodontal applications, and nasal rinsing is described.

Traditionally, for preparing the salt solution, regular or distilled water, table salt, or sea salt are used (sea salt is richer in its mineral composition). Water contains air, which negatively affects its properties.

It is proposed to use vibro-bis activated (vibro-bis) salt solution because of the activation of salt solution by M. L. Melikyan, which refers to the improvement of salt solubility and removal of air from the water due to vibration-mechanical impact on the salt solution.

The vibration-mechanical method of salt solution preparation comprises 4 steps:

Stage I, vibration impact on the water;

Stage II, water heating;

Stage III, the salt solution preparation;

Stage IV, vibration impact on the salt solution.

The following steps are disclosed in more detail. According to one non-limiting example, 200 grams of pure or bottled water and up to 2 teaspoons of table or sea salt are used to prepare the salt solution.

Stage I, to remove the dissolved air from the water, a 1000 Hz vibrating table is used. The beaker with water is placed on the vibrating table and turned on for 2-3 minutes. The vibration process removes dissolved air from the water in the form of bubbles. After the air bubbles disappear, the vibration table is turned off. In this way, a preliminary vibration effect on the water and removal of dissolved air from the water is carried out. Then proceed to the heating of the water.

Stage II, water is heated to the boil, and then the salt solution is made.

Stage III, up to 2 teaspoons of salt are added to a glass of boiled water, and after thorough mixing in any convenient way, a homogeneous salt solution is obtained.

Then proceed to the vibration impact on the salt solution.

Stage IV, the vibration impact on the salt solution is carried out in the same way as the vibration impact on the water in Stage I, as described above.

Mechanical vibration provides the following beneficial effects:

10. ensures maximum removal of dissolved air;
11. contributes to the structuring of water;
12. improves the solubility of salt in water and accelerates the formation of a uniform (homogeneous) mixture;
13. because of vibration, the molecules of the dissolved substance are less able to be held together and therefore dissolve more easily;
14. improves the properties of the solution (density and homogeneity of the solution);
15. provides highly effective cleaning and polishing of teeth, composite restorations, dental structures, and removable and non-removable dentures.

In general, one can conclude (e.g., based on [Unexpected Properties of Degassed Solutions, Barry W. Ninham and Pierandrea Lo Nostro, The Journal of Physical Chemistry B 2020 124 (36), 7872-7878, DOI: 10.1021/acs.jpcb.0c05001] and [Experimental study of the dynamics of solid and gas inclusions in liquid in vibration and acoustic fields, Fattalov O. O., PhD dissertation]) that the vibration impact on water and its heating ultimately leads to the degassing of water. After preparing the salt solution with such water, the degassed salt solution can still retain nanobubbles, and vibrating such a salt solution reduces the number of nanobubbles. It is also known that the diameter of the resulting bubbles in the salt solution decreases with increasing salt concentration when the salt solution is exposed to vibration.

The authors of the invention have found that the vibrationally bi-activated salt solution provides highly effective cleaning and polishing of teeth, composite restorations, dental structures, and removable and fixed dentures. The effect is achieved by the maximum removal of dissolved air in the salt solution and improved salt solubility therein.

After the solution has cooled to body temperature, the individual or professional hydrothermal-vibrational method of cleaning and polishing teeth according to the concept of temperature equilibrium by M. L. Melikyan is started.

Individual or professional cleaning and polishing of teeth, composite restorations, dental structures, and prostheses using a vibrating activated salt solution heated to body temperature is performed similarly as tooth cleaning and polishing with toothpaste or polishing paste described above, only with the difference that a vibrationally bi-activated salt solution is used instead of toothpaste and polishing paste.

The vibrationally bi-activated solution produced by the proposed method is environmentally friendly without dyes and other chemical additives.

In cleaning and polishing using a vibrating end-tufted vibration device, the salt solution is additionally subjected to vibration.

In other words, the salt solution is subjected to vibration three times during preparation and during cleaning and polishing, which together improves its cleaning and polishing properties.

The application of a vibrationally bi-activated salt solution when cleaning and polishing of teeth provides the following effects:

16. provides a natural antibacterial treatment of the teeth and gums, as the salt solution has pronounced antimicrobial properties;
17. reduces the acidity and minimizes the likelihood of cavities, gingivitis and periodontal disease;
18. helps to eliminate inflammation, reduce swelling of the gingiva, and steadily keeps her in a healthy state;
19. helps eliminate bad breath (because salt is an effective antiseptic) and ensures fresh breath (a sign of healthy teeth and mouth);
20. provides a brightening effect and helps maintain the natural color of teeth, composite restorations;
21. provides atraumatic cleaning and polishing of teeth, composite restorations, dental structures, removable and non-removable dentures;
22. does not traumatize enamel and gums;
23. provides highly effective cleaning and polishing of all tooth surfaces.

Long-term clinical observations by the authors of the invention have shown that using a vibrating device and vibrating activated salt solution provides high efficiency by not only cleaning but polishing teeth, composite restorations, dental structures, and removable and non-removable dentures.

Vibrationally bi-activated salt solution provides simultaneous cleaning and micropolishing under temperature equilibrium conditions to replace traditional toothpastes and polishing pastes.

The multifunctional adjustable vibrating end-tufted device can also be used for systemic home (non-clinical) or professional (clinical) dental care of animals according to the concept of temperature equilibrium by M. L. Melikyan The multifunctional adjustable vibrating end-tufted device and vibrationally bi-activated salt solution allow individual and professional oral care, cleaning and polishing of teeth, composite restorations, and removable and non-removable dental structures according to the concept of temperature equilibrium.

The proposed vibrationally bi-activated salt solution can also be used for periodontal applications for gingival inflammation, for nasal lavage, including using the proposed vibrating nasal lavage device.

The following is a discussion of periodontal applications for gingival inflammation using the proposed vibrationally bi-activated salt solution.

The authors of the invention have found that using periodontal application with the use of vibrationally bi-activated salt solution in temperature equilibrium conditions provides high efficiency in the treatment of periodontal disease.

Applications refer to the application of a special ointment, gel, or solution directly to the damaged area.

In dentistry, an application is a superficial application of a drug to the gums or enamel of the teeth. Periodontal, or periodontal, applications are thought to be more effective than rinses and superficial applications of gel or ointment.

Currently, periodontal applications are one of the methods of conservative treatment of periodontal disease.

From the literature, it has been found that in the treatment of periodontal tissues, salt solutions are used, which draw liquid from the inflamed area, resulting in bacteria and microorganisms being deprived of their natural habitat, which stimulates the restoration of periodontal tissues and reduces inflammation.

In order to ensure the effectiveness of treatment of periodontal diseases, the authors of the invention developed a method of periodontal application using the vibrationally bi-activated salt solution.

After professional tooth cleaning, the doctor applies a sterile gauze cloth soaked in a vibrationally bi-activated salt solution heated to body temperature for 3-5 minutes to the inflamed area of the gum. After the procedure, the mouth should be rinsed with water after 5 minutes. At subsequent appointments, the doctor repeats the procedure until the periodontal disease is completely cured.

One of the major advantages of the developed method is its simplicity and accessibility, which allows the patient to perform periodontal applications at home until the complete treatment of periodontal disease. The patient then performs prophylactic periodontal applications 4-5 times a month, which dramatically minimizes the likelihood of periodontal disease. The proposed method saves money for the patient and time for the doctor.

Further, we consider a vibrating device and method of nasal lavage using a vibrationally bi-activated salt solution in temperature equilibrium conditions according to M. L. Melikyan.

To ensure effective hygiene of the nasal cavity, the authors of the invention proposed a vibrating device and a method of nasal lavage with a vibrationally bi-activated salt solution in temperature equilibrium conditions.

To rinse the nose, a vibrationally bi-activated salt solution is used, which is designed for cleaning and polishing teeth (the method of its preparation is described above).

A vibrating nasal irrigation device comprises a ceramic or plastic container where a vibrationally bi-activated salt solution is poured and heated to body temperature. A removable or non-removable vibration device is mounted on the container, which provides a frequency of 1000 Hz. A heated salt solution is poured into the container and a 1000 Hz vibrating device is turned on. The head is tilted on the side, the spout of the container is placed into the nostril, and the solution is gently poured into it. A salt solution flows out of the second nostril. Then the same procedure is repeated, but on the other side.

In this way, nasal lavage is performed using a vibrating device and three times a vibrationally bi-activated salt solution according to the concept of temperature equilibrium. It is recommended to rinse the nose twice in the morning and evening (before going to bed).

Nasal lavage with a vibrationally bi-activated salt solution under temperature equilibrium conditions provides the following effects:

24. provides effective cleansing of the nasal passages;
25. flushes pollen, dust, and any other dirt from the nasal passages and reduces nasal congestion;
26. moistens the nasal mucosa and ensures its healthy condition;
27. promotes the removal of pathogens, both viral and bacterial;
28. the flow of fluid removes excess mucus (snot);
29. prevents the development of airborne diseases;
30. relives the symptoms of rhinitis, prevents the development of complications such as maxillary sinusitis and sinusitis.

The vibratory method of nasal lavage before bedtime helps normalize nasal breathing, which minimizes complications from teeth, gums, composite restorations, etc.

A vibrating device for grooming animals' teeth is also available. It is known that the body temperature of different animals vary. For example, the normal body temperature for dogs and cats is between 38.3 and 39.2 degrees Celsius. When cleaning and polishing teeth under temperature equilibrium conditions, the body temperature of each animal shall be considered. The temperature of the toothpaste, polishing paste, tooth cleaning solution and the working part of the vibrating brush should correspond to the body temperature of the animal, which together ensure high efficiency of tooth cleaning and polishing.

Nonclinical or clinical animal dental care according to the concept of temperature equilibrium by M. L. Melikyan is carried out similarly to the methods described above.

The invention is not limited to the forms given as examples and is defined by the claims.

The invention claimed is:

1. A method for cleaning of surfaces of teeth, composite restorations, and removable and non-removable dental structures using a multifunctional adjustable vibrating end-tufted device for individual and professional oral care, cleaning and polishing of teeth, composite restorations, and removable and non-removable dental structures according to the concept of temperature equilibrium, the device comprising:

a handle having a driving mechanism, and a replaceable nozzle attached to the handle that has a fixing part and a working part, wherein the working part of the replaceable nozzle comprises bristles and is fixed in an opening of the fixing part to form an end-tuft, and a front edge of the fixing part has a curvilinear shape on the side of the opening of the fixing part, the replaceable nozzle is configured to adjust a degree of impact of the bristles to a surface of teeth, composite restorations or dental structures, which is to be cared, cleaned or polished depending on a pressing force applied to the replaceable nozzle, and the handle is configured to transmit vibration generated by the driving mechanism to the working part of the replaceable nozzle, the method including:

heating toothpaste and a replacement nozzle to a common body temperature, applying the toothpaste to a working part of the replacement nozzle, placing the working part of the replaceable nozzle on the surface of tooth, composite restoration or dental structure so that a longitudinal axis of the working part of the replaceable nozzle is perpendicular to the surface of tooth, composite restoration or dental structure or close to such position, pressing the working part of the replaceable nozzle so that side parts of the bristles at least partially or completely contact the surface of the tooth, composite restoration, or dental structure, actuating the driving mechanism to generate vibration of the working part of the replaceable nozzle, holding the working part of the replaceable nozzle substantially stationary against the tooth, composite restoration, or dental structure within its surface boundaries or moving the working part of the replaceable nozzle along the vertical axis of the tooth, composite restoration or dental structure within its surface boundaries, and rinsing the mouth with a liquid heated to the body temperature.

2. The method according to claim 1, wherein the degree of impact of the bristles to the surface of tooth, composite restoration, or dental structure is controlled by the pressing force on the replaceable nozzle.

3. The method of claim 1, wherein the working part takes a concave shape when the replaceable nozzle is pressed.

* * * * *